(12) United States Patent
Abdelghaffar et al.

(10) Patent No.: US 12,120,655 B2
(45) Date of Patent: Oct. 15, 2024

(54) TIME-DIVISION MULTIPLEXING SOUNDING REFERENCE SIGNAL PORTS

(71) Applicant: QUALCOMM Incorporated, San Diego, CA (US)

(72) Inventors: Muhammad Sayed Khairy Abdelghaffar, San Jose, CA (US); Jing Jiang, San Diego, CA (US); Joseph Patrick Burke, San Diego, CA (US); Tingfang Ji, San Diego, CA (US); Peter Gaal, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/456,836

(22) Filed: Nov. 29, 2021

(65) Prior Publication Data
US 2023/0171756 A1 Jun. 1, 2023

(51) Int. Cl.
*H04W 72/044* (2023.01)
*H04B 7/06* (2006.01)
(Continued)

(52) U.S. Cl.
CPC ........ *H04W 72/046* (2013.01); *H04B 7/0684* (2013.01); *H04L 5/0048* (2013.01); *H04W 72/0446* (2013.01)

(58) Field of Classification Search
CPC ............ H04W 72/046; H04W 72/0446; H04B 7/0684; H04L 5/0048; H04L 5/0092;
(Continued)

(56) References Cited

U.S. PATENT DOCUMENTS

| 11,695,458 B2 | 7/2023 | Wernersson et al. |
| 2011/0075713 A1* | 3/2011 | Lovberg ............... H04L 27/2039 |
| | | 375/308 |

(Continued)

FOREIGN PATENT DOCUMENTS

| WO | 2020220358 A1 | 11/2020 |
| WO | 2021124585 A1 | 6/2021 |
| WO | 2021151249 A1 | 8/2021 |

OTHER PUBLICATIONS

Zhang et al., "Transmitting Multiplexed Sounding Reference Signal Ports in New Radio", PCT/CN2017/070624, Dec. 7, 2018 (Year: 2018).*

(Continued)

*Primary Examiner* — Thinh D Tran
(74) *Attorney, Agent, or Firm* — Procopio, Cory, Hargreaves & Savitch LLP

(57) ABSTRACT

A user equipment (UE) may spatial time-division multiplex a plurality of sounding reference signal (SRS) ports, each of the plurality of SRS ports being associated with at least one of a set of orthogonal weights, the set of orthogonal weights corresponding to phase shifting, and transmit a plurality of SRSs via the plurality of spatially time-division multiplexed SRS ports simultaneously, each of the plurality of SRSs including at least two SRS repetition. The plurality of SRSs may be configured to form or present a quasi-co-location (QCL) receive (Rx) beam subspace. The UE may configure the plurality of SRSs to form the subspace as the QCL Rx beam subspace, and a base station may signal the UE to a specific Rx beam subspace such that it is aligned to the base station's beamforming direction, and achieve spatial multiplexing gain in the QCL Rx beam subspace.

30 Claims, 16 Drawing Sheets

(51) Int. Cl.
*H04L 5/00* (2006.01)
*H04W 72/0446* (2023.01)

(58) Field of Classification Search
CPC . H04L 27/2613; H04L 5/0023; H04L 5/0026; H04L 27/26132; H04L 5/0051; H04J 13/004
See application file for complete search history.

(56) References Cited

U.S. PATENT DOCUMENTS

| | | | | |
|---|---|---|---|---|
| 2019/0288808 | A1* | 9/2019 | Baldemair | H04W 72/21 |
| 2020/0007294 | A1* | 1/2020 | Yang | H04W 52/146 |
| 2020/0153573 | A1* | 5/2020 | Baldemair | H04L 5/0042 |
| 2020/0205090 | A1* | 6/2020 | Loehr | H04W 72/21 |
| 2020/0329437 | A1* | 10/2020 | MolavianJazi | H04W 52/346 |
| 2022/0046559 | A1* | 2/2022 | Wu | H04W 72/0446 |
| 2022/0158794 | A1* | 5/2022 | Zhang | H04L 5/0055 |
| 2023/0018270 | A1* | 1/2023 | Okamura | H04L 27/2634 |
| 2023/0291447 | A1* | 9/2023 | Wernersson | H04W 72/0473 |
| | | | | 370/329 |

OTHER PUBLICATIONS

Qualcomm Incorporated, "Discussion on SRS enhancement", 3GPP TSG-RAN WG1 Meeting #103-e, R1-2009255, Oct. 26-Nov. 13, 2020 (Year: 2020).*
Catt: "Discussion on SRS Enhancement for Rel-17", 3GPP TSG RAN WG1 #104-e, R1-2100348, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, 17 Pages, XP051970951, Sections 1-5, p. 6, paragraph 3 tables 1-3, p. 12, paragraph 4.1.
Huawei et al., "Enhancements on SRS for Rel-17", 3GPP TSG RAN WG1 Meeting #104-e, R1-2100213, 3rd Generation Partnership Project, Mobile Competence Centre, 650, Route Des Lucioles, F-06921 Sophia-Antipolis Cedex, France, vol. RAN WG1, No. E-meeting, Jan. 25, 2021-Feb. 5, 2021, 18 Pages, Jan. 19, 2021, XP051970845, p. 7, paragraph 5.1 p. 11, paragraph 5.2 figure 11.
International Search Report and Written Opinion—PCT/US2022/050005—ISA/EPO—Feb. 23, 2023.

* cited by examiner

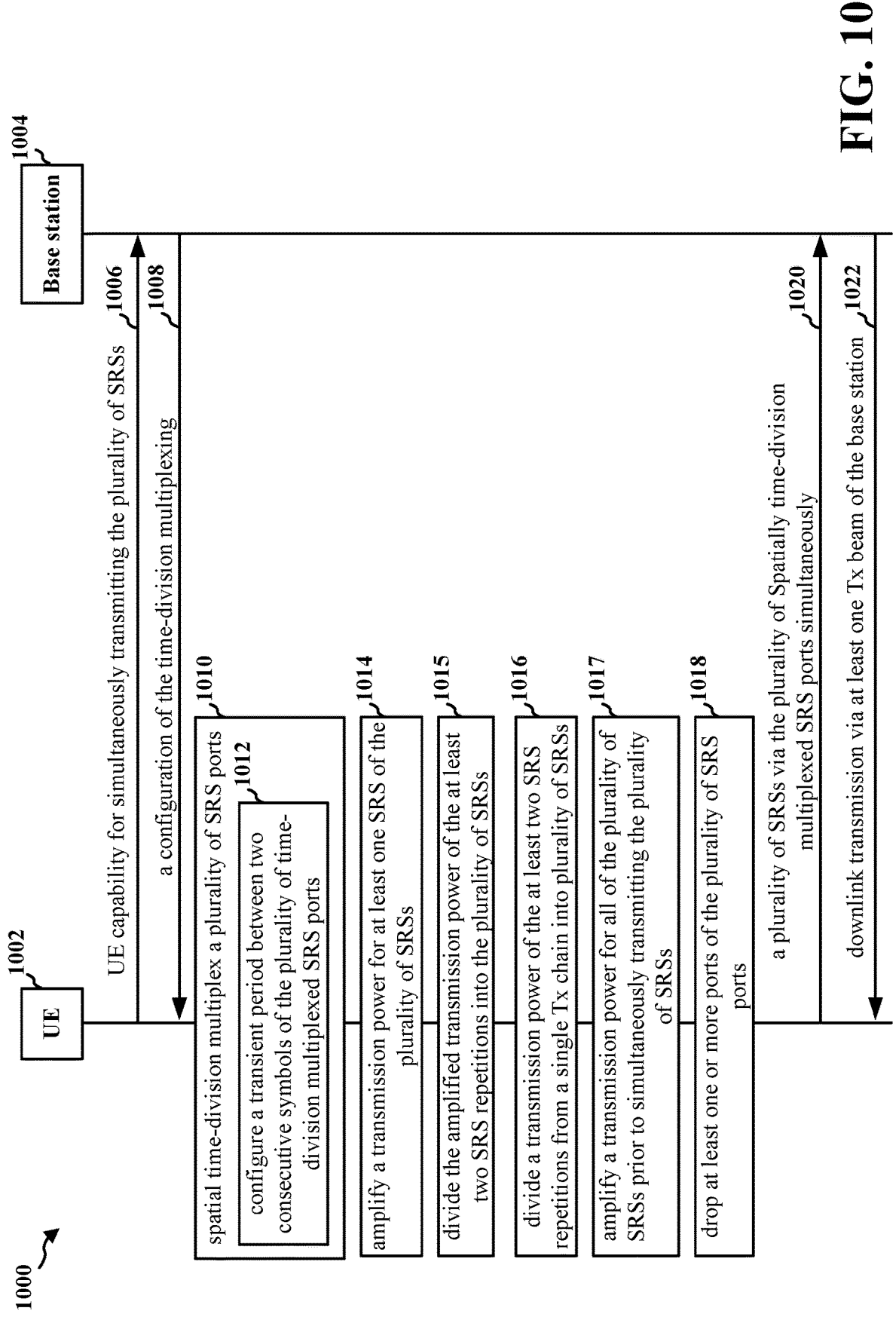

TIME-DIVISION MULTIPLEXING SOUNDING REFERENCE SIGNAL PORTS

TECHNICAL FIELD

The present disclosure relates generally to communication systems, and more particularly, to a method of wireless communication including time-division multiplexing a plurality of sounding reference signal (SRS) ports to transmit a plurality of SRSs.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) and a base station. The UE may spatial time-division multiplex a plurality of sounding reference signal (SRS) ports each of the plurality of SRS ports being associated with at least one of a set of orthogonal weights, the set of orthogonal weights corresponding to phase shifting, and transmit a plurality of SRSs via the plurality of spatially time-division multiplexed SRS ports simultaneously, each of the plurality of SRSs including at least two SRS repetitions. The plurality of SRSs may be configured to form or present a quasi-co-location (QCL) receive (Rx) beam subspace. The UE may configure the plurality of SRSs to form the subspace as the QCL Rx beam subspace, and the base station may signal the UE to a specific Rx beam subspace such that it is aligned to the base station's beamforming direction, and achieve spatial multiplexing gain in the QCL Rx beam subspace.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a call-flow diagram of a method of wireless communication.

DETAILED DESCRIPTION

Figure 1:
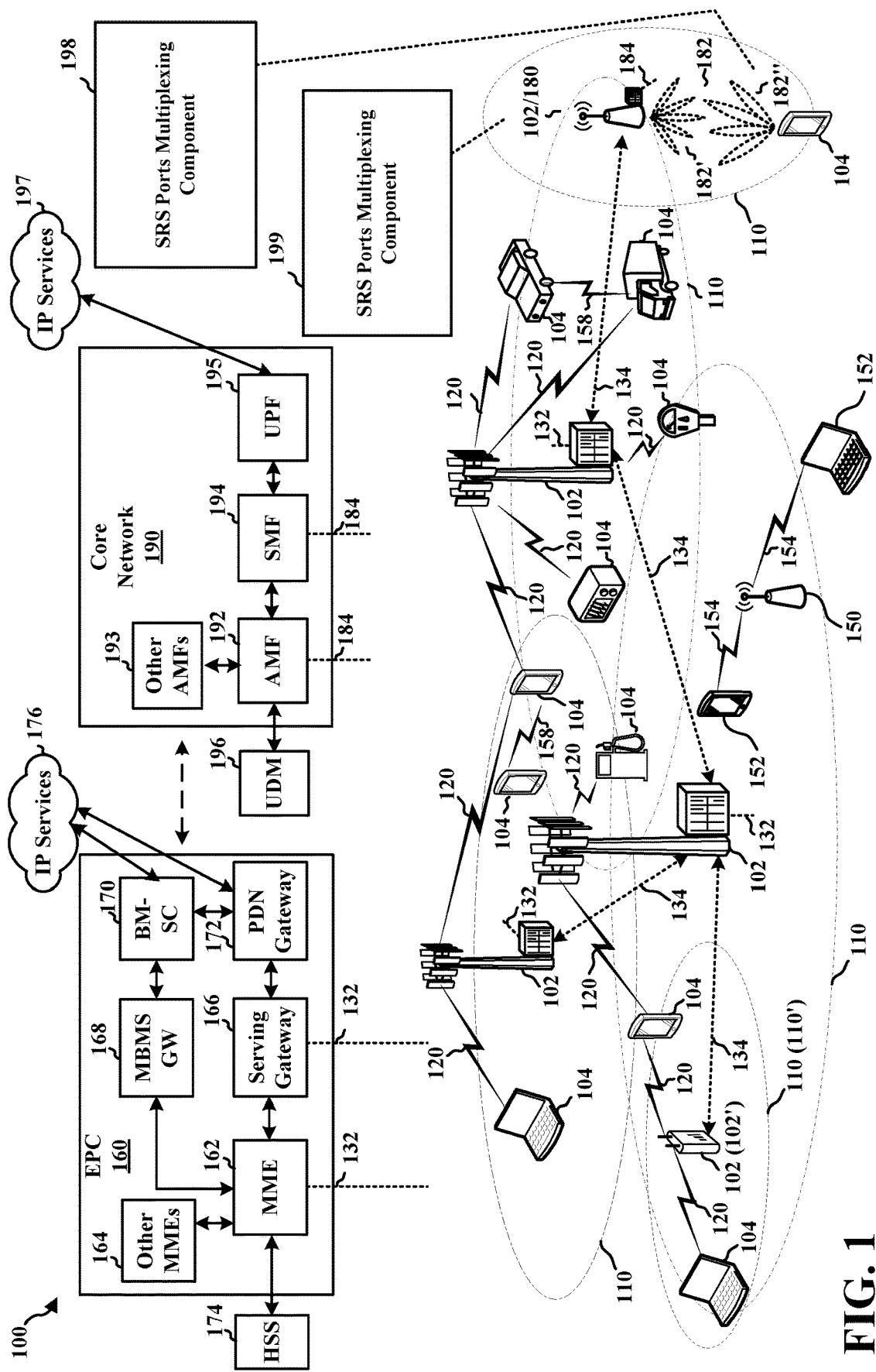
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an SRS ports multiplexing component 198 configured to spatial time-division multiplex a plurality of SRS ports, each of the plurality of SRS ports being associated with at least one of a set of orthogonal weights, the set of orthogonal weights corresponding to phase shifting, and transmit, to a base station, a plurality of SRSs via the plurality of spatially time-division multiplexed SRS ports simultaneously, each of the plurality of SRSs including at least two SRS repetitions. In certain aspects, the base station 180 may include an SRS ports multiplexing component 199 configured to transmit, to a UE, a configuration of spatial time-division multiplexing for the UE to spatially time-division multiplex a plurality of SRS ports, each of the plurality of SRS ports being associated with at least one of a set of orthogonal weights, the set of orthogonal weights corresponding to phase shifting, and receive, from the UE, a plurality of SRSs via the plurality of spatially time-division multiplexed SRS ports simultaneously, each of the plurality of SRSs including at least two SRS repetitions. Although the following description may be focused on 5G NR, the concepts described herein may be applicable to other similar areas, such as LTE, LTE-A, CDMA, GSM, and other wireless technologies.

Figure 2:
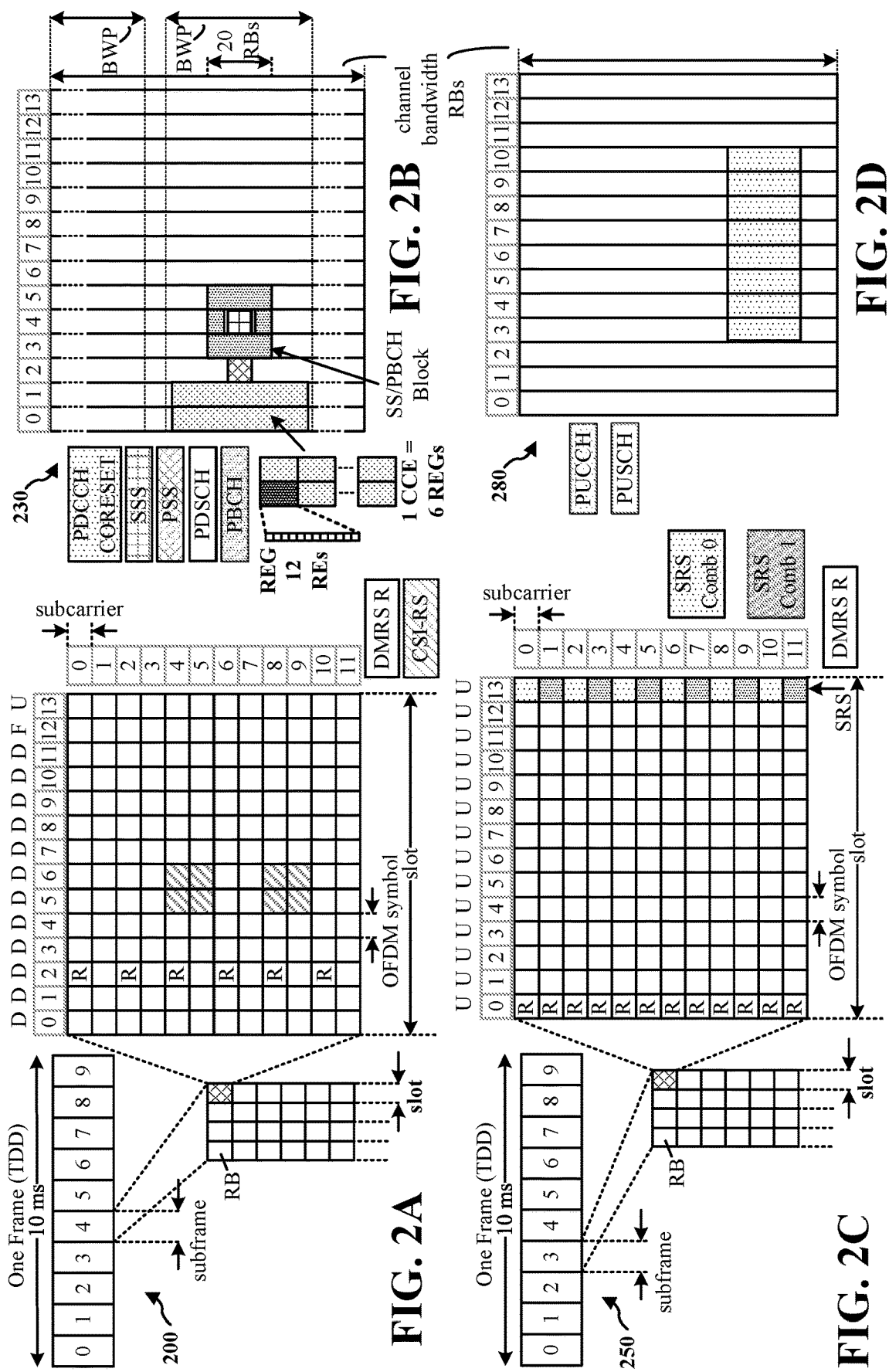
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
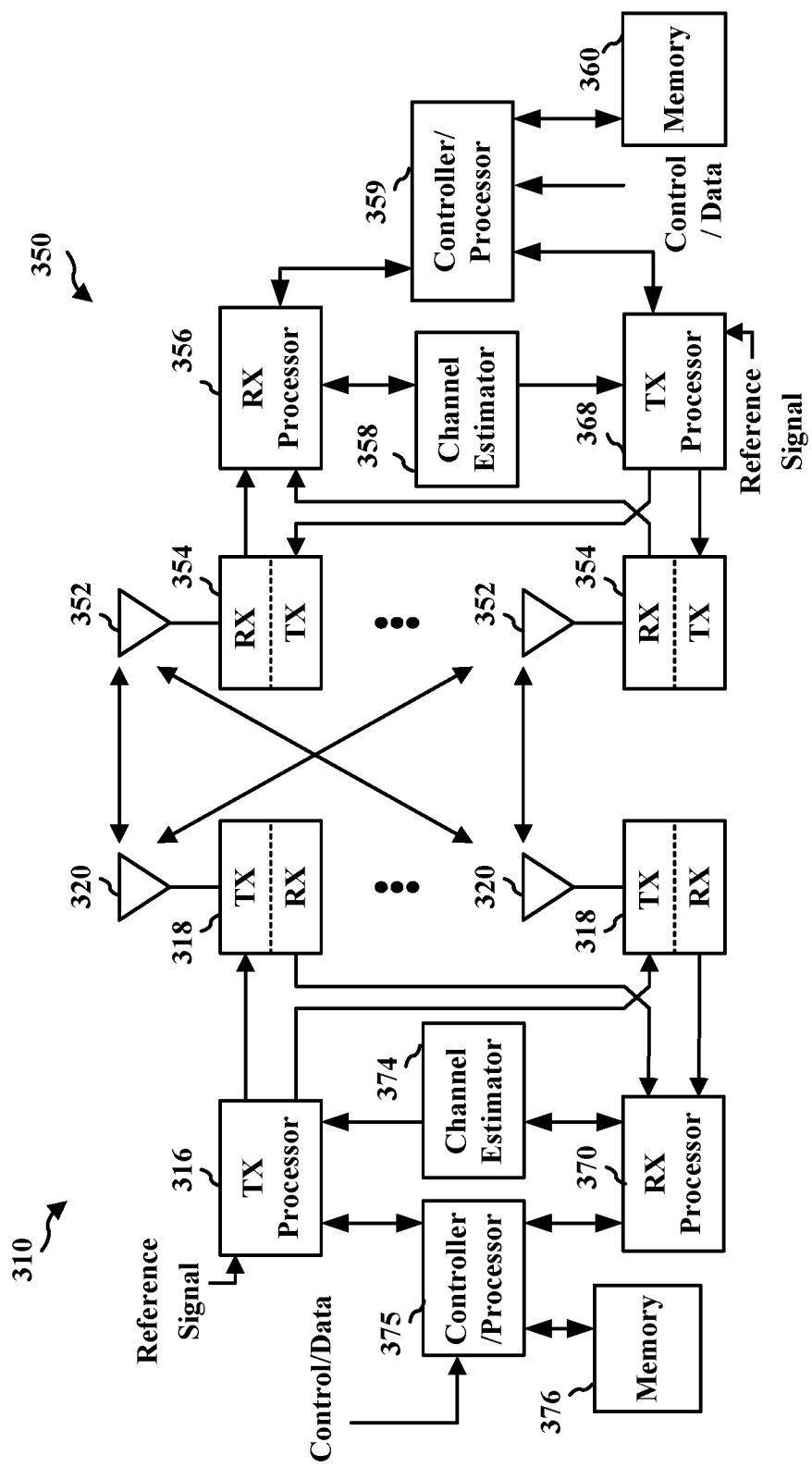
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects, a UE may transmit a plurality of SRSs for antenna switching to a base station, and the base station may estimate the plurality of SRSs received from the UE to perform beam management. The plurality of SRS ports may be multiplexed and a plurality of SRSs may be transmitted to the base station via a plurality of multiplexed SRS ports. In one aspect, the plurality of SRS ports may be multiplexed over frequency, i.e., frequency-division multiplexed (FDMed), using different comb structures. That is, bandwidth parts may be divided in the frequency domain and multiplex the plurality of SRS ports, e.g., with different combs to provide the SRS tones on even or odd symbols. In another aspect, the plurality of SRS ports may be multiplexed using different cyclic shifts, i.e., code-division (CDMed) on the same frequency resources. In another aspect, the plurality of SRS ports may be multiplexed using time-division switching.

Figure 4A:
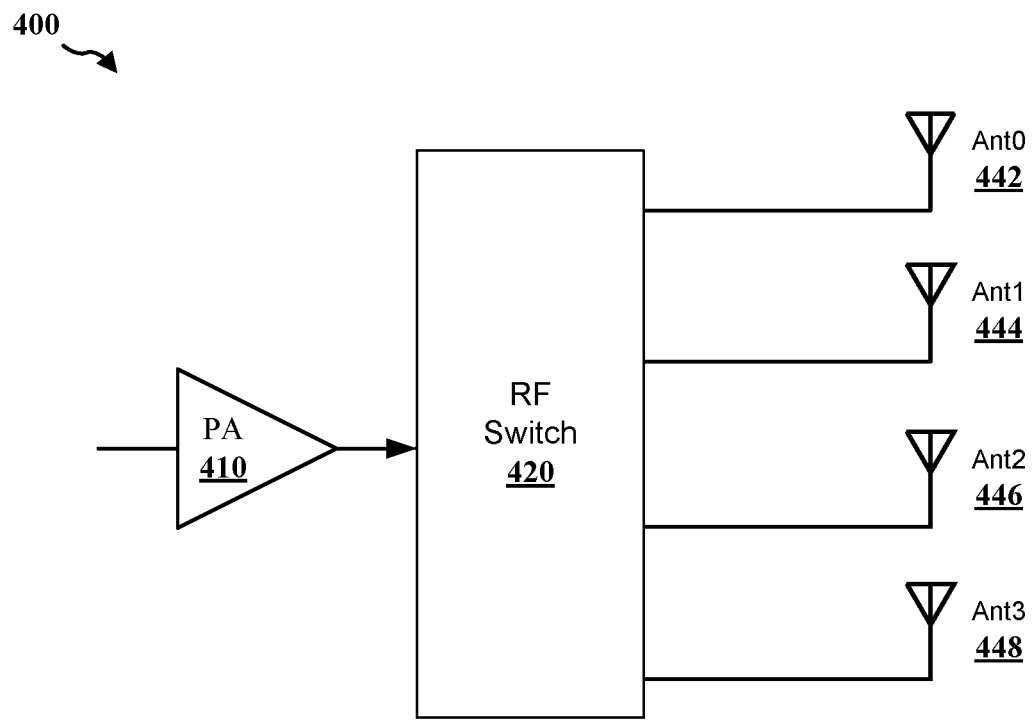
FIGS. 4A and 4B illustrate a method of wireless communication including time-division switching sounding reference signal (SRS) ports.
Figure 4B:
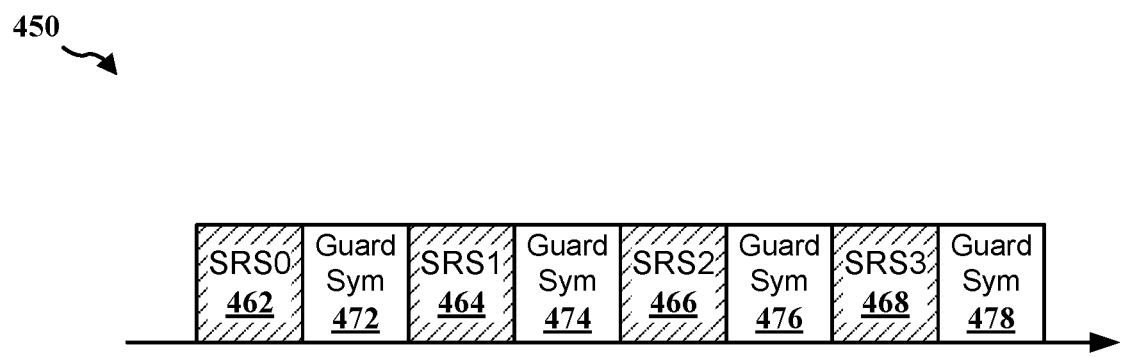

FIGS. 4A and 4B illustrate a method of wireless communication including time-division switching a plurality of sounding reference signal (SRS) ports. FIG. 4A includes the plurality of SRS ports 400 and FIG. 4B includes an example of a plurality of SRSs 450 to be transmitted through the plurality of SRS ports 400. The plurality of SRS ports 400 may include a power amplifier 410, a radio frequency (RF) switch 420, and four (4) antennas including a first antenna port (Ant0) 442, a second antenna port (Ant1) 444, a third antenna port (Ant2) 446, and a fourth antenna port (Ant3) 448. The RF switch 420 may be configured to receive the plurality of SRSs 450 and route the plurality of SRSs to the four antennas.

FIG. 4B illustrates that the plurality of SRSs may include four SRSs, including a first SRS 462 for the first antenna port, a second SRS 464 for the second antenna port, a third SRS 466 for the third antenna port, and a fourth SRS 468 for the third antenna port. The RF switch 420 may be configured to consecutively route the first SRS 462, the second SRS 464, the third SRS 466, and the fourth SRS 468 to the respective antenna ports. That is, the UE may consecutively transmit the first SRS 462 via the first antenna port 442, the second SRS 464 via the second antenna port 444, the third SRS 466 via the third antenna port 446, and the fourth SRS 468 via the fourth antenna port 448.

Since the RF switch 420 may need a software/hardware processing time to switch the SRS antenna switching between the plurality of antenna ports, the UE may configure guard symbols between the SRSs for the RF switch to perform the SRS antenna switching between the plurality of antenna ports including the first antenna port (Ant0) 442, the second antenna port (Ant1) 444, the third antenna port (Ant2) 446, and the fourth antenna port (Ant3) 448. That is, the plurality of SRSs may include four guard symbols, including a first guard symbol 472 between the first SRS 462 and the second SRS 464, a second guard symbol 474 between the second SRS 464 and the third SRS 466, a third guard symbol 476 between the third SRS 466 and the fourth SRS 468, and a fourth guard symbol 478 after the fourth SRS 468. Accordingly, for four antenna ports, four SRSs may be provided per symbol, and four guard symbols may be additionally provided between each of the four SRSs.

Figures 5A, 5B:
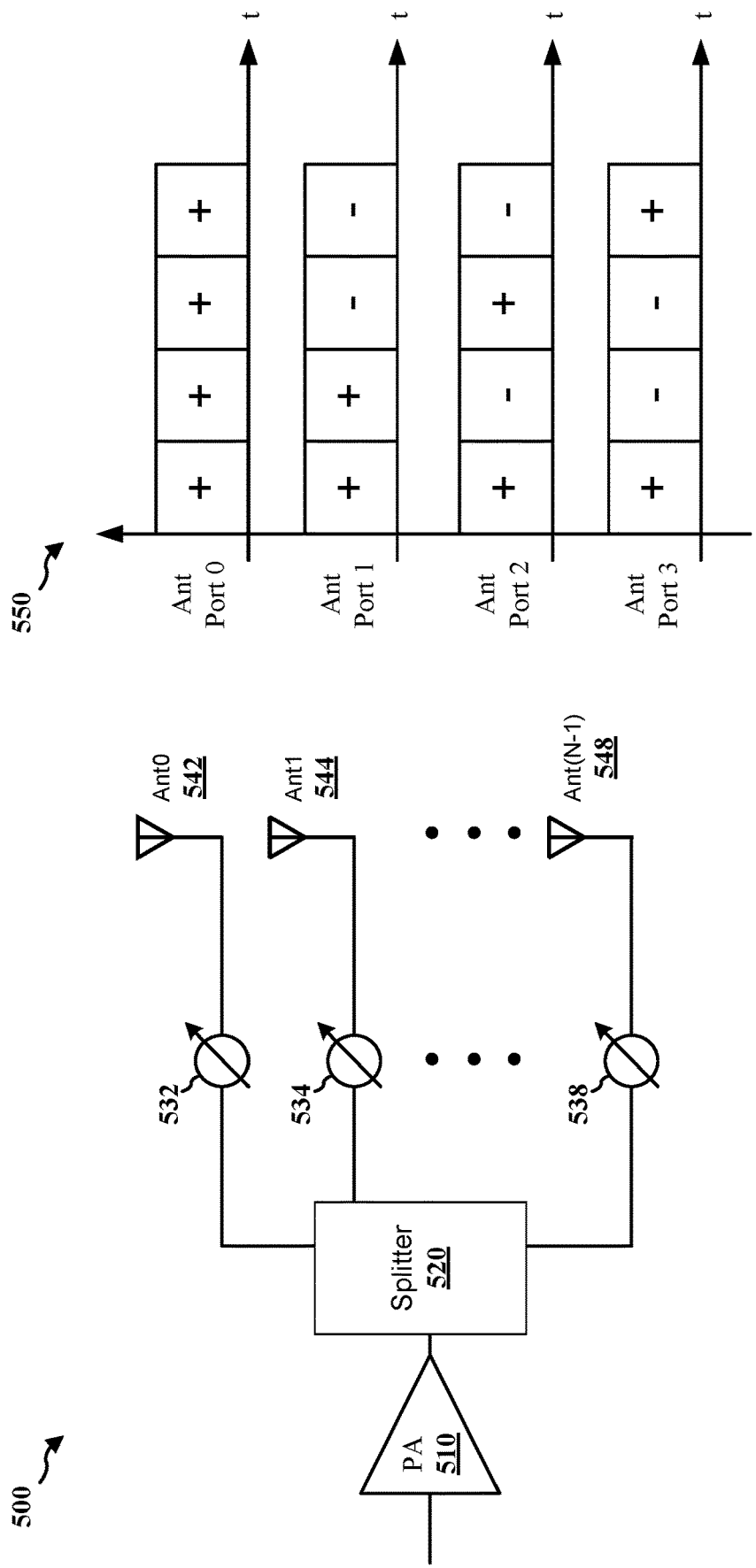
FIGS. 5A and 5B illustrate a method of wireless communication including time-division multiplexing SRS ports.

FIGS. 5A and 5B illustrate a method of wireless communication including time-division multiplexing a plurality of SRS ports 500. FIG. 5A illustrates that the time-division multiplexed SRS ports 500 may include a power amplifier 510, a splitter 520, a plurality of phase shifters 532, 534, and 538, and a plurality of antennas 542, 544, and 548. To improve SRS port multiplexing, the UE may provide time-division multiplexing which may improve the SRS capacity. For example, the UE may use a time-division orthogonal cover code (TD-OCC) to multiplex the SRS ports and transmit the SRS to the base station simultaneously.

To realize SRS port multiplexing, a single Tx chain can be utilized with multiple phase shifters per each antenna port. That is, the UE may transmit a plurality of SRSs using the single Tx chain, and the UE may utilize the single Tx chain to send the plurality of SRSs to the plurality of SRS ports. The plurality of SRSs may include N repetitions of an SRS. In one example, the number N may refer to a number of a plurality of antenna ports. The plurality of antenna ports may be time-domain multiplexed to apply a corresponding phase shift in the RF plane and the plurality of SRSs may be transmitted simultaneously to the base station via each of the plurality of time-domain multiplexed SRS ports.

The time-division multiplexed SRS ports 500 illustrate that the single Tx chain may be used to send the plurality of SRSs to the power amplifier 510, and the splitter may split the power of the plurality of SRSs to each of the plurality of antennas. The time-division multiplexed SRS ports may be configured with a plurality of orthogonal vectors. For example, the UE may use a Walsh code of length N TD-OCC to multiplex the SRS ports. FIG. 5B illustrates the plurality of orthogonal vectors 550 includes four (4) orthogonal vectors in the RF plane, including [+, +, +, +], [+, +, −], [+, +, −], and [+, +]. That is, the first phase shifter 532 of the time-division multiplexed SRS ports 500 may apply the same phase for four SRSs, and the second phase shifter 534 of the time-division multiplexed SRS ports 500 may apply the same phase for the first two SRSs and invert the phase (i.e., change from '+' to '−') for the third and fourth SRSs. The third phase shifter 536 of the time-division multiplexed SRS ports 500 may flip the phase every SRS, and the fourth phase shifter 534 of the time-division multiplexed SRS ports 500 may apply the same phase for the first and fourth SRSs and invert the phase (i.e., change from '+' to '−') for the second and third SRSs. Accordingly, the plurality of SRSs that the UE used the single Tx chain for the transmission to the base station may be transmitted simultaneously.

The repetition of N SRS symbols may be generated and fed to a single RF chain to be transmitted to the base station using the time-division multiplexed SRS ports configured with the plurality of orthogonal vectors, and therefore, the N time-division multiplexed SRS ports 500 may also be spatially multiplexed with each other. The phase shifters may provide inter-symbol accurate and prompt phase shifting to support the orthogonality of the vectors in the RF plane.

In one aspect, the SRS repetition may be intra-slot within any N OFDM symbols within the slot. That is, the plurality of SRSs including the at least two SRS repetitions may be intra-slot allocated within one slot. In another aspect, the SRS repetition may be inter-slot allocated across back-to-back slots. That is, the plurality of SRSs including the at least two SRS repetitions may be inter-slot allocated across at least two back-to-back slots.

Compared to the plurality of SRS ports 400 of FIG. 4A, the time-division multiplexed SRS ports 500 may have a reduced RF complexity. In one aspect, the time-division multiplexed SRS ports 500 may include a splitter 520 that may split the power of the plurality of SRSs to the plurality of antennas. The time-division multiplexed SRS ports 500 may not include an RF switch. Accordingly, the time-division multiplexed SRS ports 500 may save on the RF switchers and may reduce an insertion loss and enable higher Tx power.

In another aspect, the time-division multiplexed SRS ports 500 may have a simpler RF architecture and a reduced number of RF chains and power amplifiers. That is, the time-division multiplexed SRS ports 500 may utilize the single Tx chain to send the plurality of SRSs to the plurality of SRS ports.

In another aspect, the time-division multiplexed SRS ports 500 may remove the guard symbol specification for the SRS antenna switching, and the time to configure the antennas may be shortened. For example, in a case where the SRS ports are configured with one Tx port and four Rx ports (1T4R), the plurality of SRS ports 400 of FIG. 4A may include at least eight (8) symbols and the time-division multiplexed SRS ports 500 of FIG. 5A may include four (4)

symbols. The time-division multiplexed SRS ports 500 may be configured with a faster and more accurate phase steering across consecutive symbols.

In some aspects, a predefined set of orthogonal vectors may be used to time-division multiplex the plurality of SRS ports. That is, each antenna port of the plurality of SRS ports may be based on some codebook from a predefined set instead of the TD-OCC Walsh cover. In some examples, DFT based codebooks may be configured for the UE and the base station to time-division multiplex the plurality of SRS ports. For example, for four (4) SRS ports, each of the four (4) SRS ports may be configured with four (4) orthogonal vectors [1, j, 1, j], [1, −j, 1, −j], [1, j, −1, j], and [1, −j, −1, −j], and each of the plurality of SRSs may be simultaneously transmitted via the plurality of time-division multiplexed SRS ports configured with the four (4) orthogonal vectors. The base station may configure the set of codebooks for the UE to use during the SRS sounding/repetition for analog beam steering. The set of codebooks may be configured via at least one of an RRC message or the DCI.

Figure 6B:
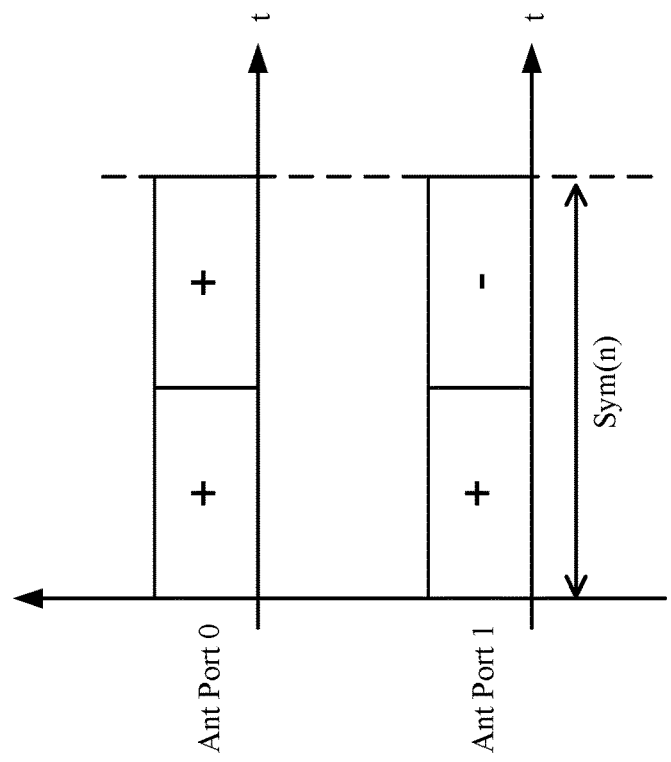
FIGS. 6A and 6B are examples of a plurality of SRSs transmitted via time-division multiplexed SRS ports.
Figure 6A:
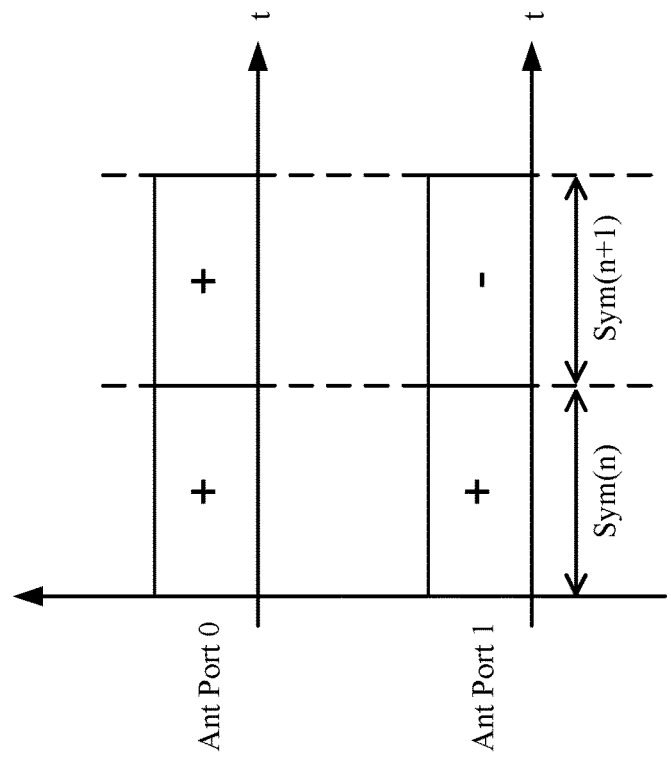

FIGS. 6A and 6B are examples of a plurality of SRSs 600 and 650 transmitted via time-division multiplexed SRS ports. FIGS. 6A and 6B may be configured for two antenna ports, e.g., antenna port 0 and antenna port 1. Both of the plurality of SRSs 600 and 650 show that the first antenna port and the second antenna port may be configured with the Walsh code of length 2 TD-OCC, e.g., [+, +] and [+, −], to multiplex the SRS ports. The first antenna port may be configured with the orthogonal vector [+, +], and the second antenna port may be configured with the orthogonal vector [+, −].

In one aspect, FIG. 6A may show that the plurality of SRSs 600 is an example of inter-symbol repetition with TD-OCC. That is, each of the plurality of SRSs 600 may be allocated in respective symbols. In one example, the first antenna port may be associated with the phase shifter that is set to introduce similar signs for both the first SRS symbol (symbol n), and the second SRS symbol (symbol n+1), e.g., [+, +]. In another example, the second antenna port may be associated with the phase shifter that is set to introduce a negative sign for the second SRS symbol (symbol n+1), e.g., [+, −].

In another aspect, FIG. 6B may show that the plurality of SRSs 650 is an example of intra-symbol repetition with TD-OCC. That is, the plurality of SRSs 650 may be allocated in one symbol. The intra-symbol repetition with TD-OCC may be associated with a higher numerology and a subset of the frequency resources may be utilized. For example, for multiplexing two ports, one of the two combs may be utilized.

In one example, the first antenna port may be associated with the phase shifter that is set to introduce similar signs for both the first SRS symbol (symbol n), and the second SRS symbol (symbol n+1), e.g., [+, +]. In another example, the second antenna port may be associated with the phase shifter that is set to introduce a negative sign for the second SRS symbol (symbol n+1), e.g., [+, −].

Figure 7:
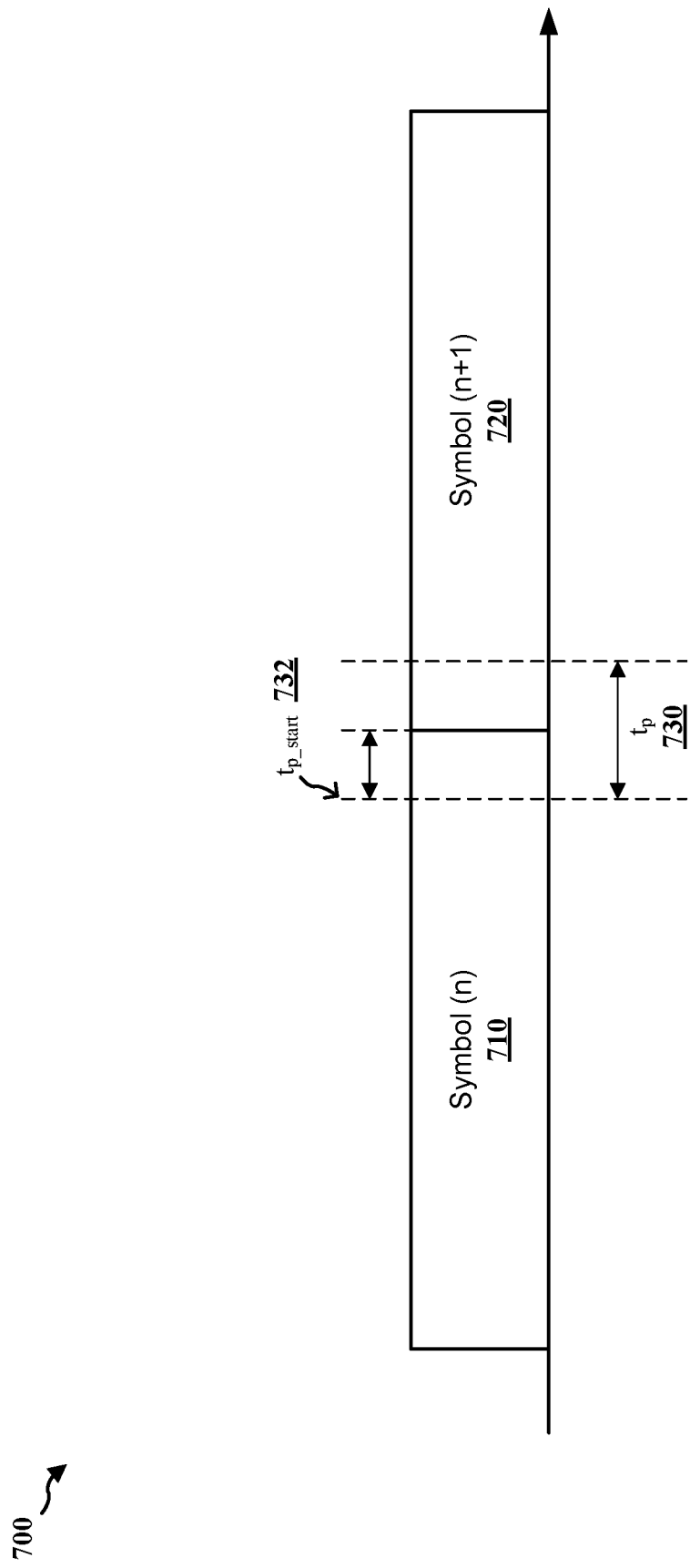
FIG. 7 is an example of a plurality of SRSs.

FIG. 7 is an example of a plurality of SRSs 700. Since the phase shifter may apply a phase shift between the SRS symbols, the UE may configure a transient period ($t_p$) 730 between two consecutive symbols. That is, an RF front end (RFFE) of the UE may include the phase shifter, and the UE may configure the transient period ($t_p$) 730 between the first symbol, e.g., symbol (n) 710, and the second symbol, e.g., symbol (n+1) 720.

In one aspect, the transient period may be symmetrically accommodated or configured between the two consecutive symbols. That is, the transient period $t_p$ 730 may include a first half of the transient period $$\frac{t_p}{2}$$

in the symbol (n) 710 and a second half of the transient period $$\frac{t_p}{2}$$

in the symbol (n+1) 720. For example, if the transient period is 10 ms, the transient period $t_p$ 730 may be configured with 5 ms in the symbol (n) 710 and 5 ms in the symbol (n+1) 720. In another aspect, the transient period may be asymmetrically accommodated or configured between the two consecutive symbols. That is, the transient period $t_p$ 730 may be configured to start from the $t_{p\_start}$ 732 of the symbol (n) 710. For example, the $t_{p\_start}$ 732 may be configured at 0 ms of symbol (n+1), and 10 ms of the transient period $t_p$ 730 may be configured in the first 10 ms of the symbol (n+1).

In some aspects, the values or parameters of $t_p$ or $t_{p\_start}$ may be based on the UE capability. That is, the transient period $t_p$ and the corresponding parameter may be determined based on the UE's capability to perform the phase shift between the two SRS symbols. For example, some UEs may be configured to make fast phase switching and may be configured with a small transient period $t_p$ 730, e.g., 2 ms, where other UEs may be configured with a large transient period $t_p$ 730, e.g., 10 ms.

Figure 8B:
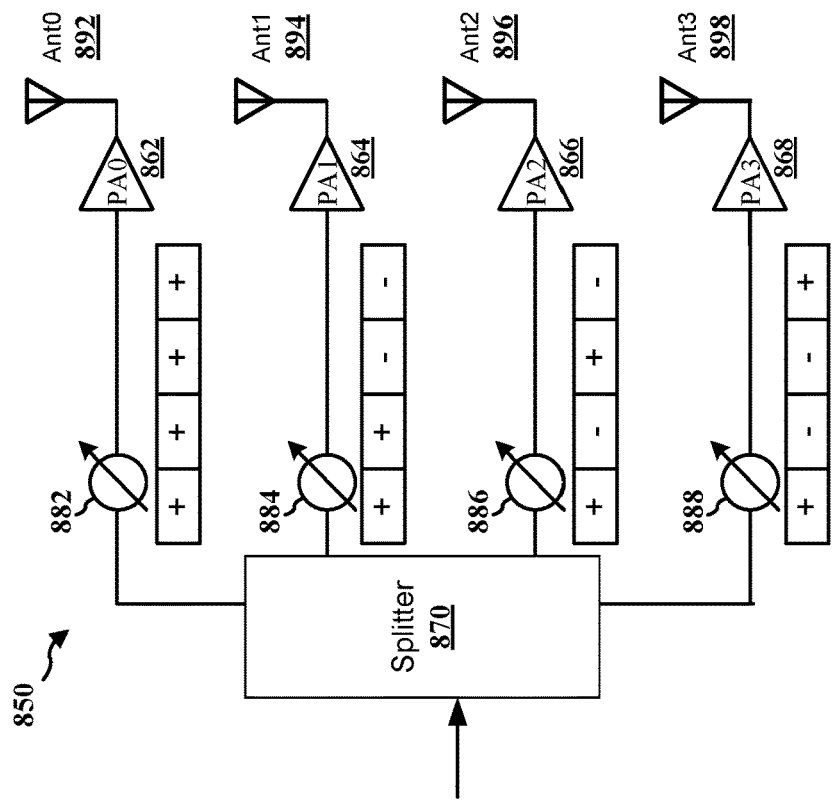
FIGS. 8A and 8B illustrate examples of a method of wireless communication including time-division multiplexing SRS ports.
Figure 8A:
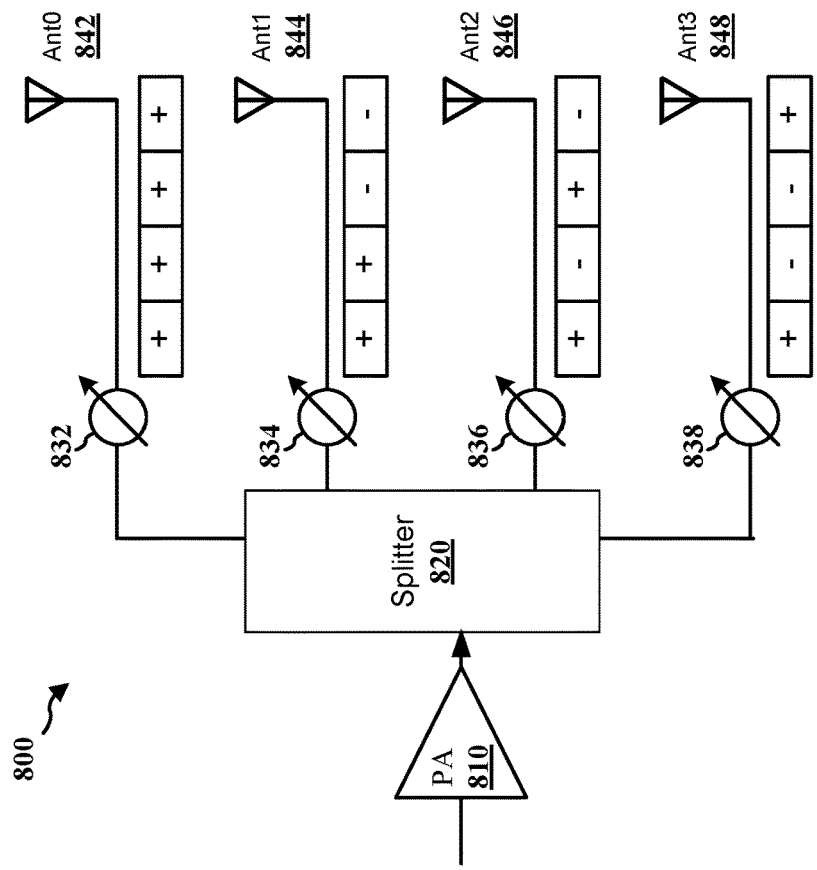

FIGS. 8A and 8B illustrate examples 800 and 850 of a method of wireless communication including time-division multiplexing of the SRS ports. In one aspect, the first example 800 may include a power amplifier 810, a splitter 820, a plurality of phase shifters including four (4) phase shifters 832, 834, 836, and 838 associated with a plurality of antennas including four (4) antennas 842, 844, 846, and 848. That is, the first example 800 may include one power amplifier prior to the splitter 820. The power amplifier 810 may receive the plurality of SRS s, and amplify the received plurality of SRSs. The splitter 820 may receive the plurality of SRSs with the amplified power and split the plurality of SRSs to the four (4) phase shifters 832, 834, 836, and 838 associated with a plurality of antennas including four (4) antennas 842, 844, 846, and 848. The four (4) phase shifters 832, 834, 836, and 838 may apply the corresponding orthogonal vectors to the plurality of SRSs, and the four (4) antennas 842, 844, 846, and 848 may simultaneously transmit the plurality of SRSs to the base station.

In another aspect, the second example 850 may include a splitter 870, a plurality of phase shifters including four (4) phase shifters 882, 884, 886, and 888 and a plurality of power amplifiers including four (4) power amplifiers 862, 864, 866, and 868, associated with a plurality of antennas including four (4) antennas 892, 894, 896, and 898. That is, the second example 850 may include four smaller power amplifiers subsequent to the splitter 870. The splitter 870 may receive the plurality of SRSs and split the plurality of SRSs to the four (4) phase shifters 882, 884, 886, and 888 associated with a plurality of antennas including four (4) antennas 892, 894, 896, and 898. The four (4) phase shifters 882, 884, 886, and 888 may apply the corresponding orthogonal vectors to the plurality of SRSs. The four (4)

power amplifiers 862, 864, 866, and 868, may receive and amplify the signals received from the four (4) phase shifters 882, 884, 886, and 888 and the four (4) antennas 892, 894, 896, and 898 may simultaneously transmit the plurality of SRSs to the base station.

Both of the first example 800 and the second example 850 have decreased UE complexity compared to the conventional 4 digital-RF chains with 4 power amplifiers. Here, the first example 800 and the second example 850 both include a single digital chain and a single RF conversion chain. The first example 800 may have a simpler architecture than the second example 850; however, the first example 800 may include at least one phase shifter that may be designed to handle non-linearity and accommodate small insertion loss. The second example 850 may include four smaller power amplifiers with a phase shifter per the four power amplifiers. Accordingly, the second example 850 may not have an issue from a post-PA insertion loss issue or the linearity design.

Figures 9A, 9B:
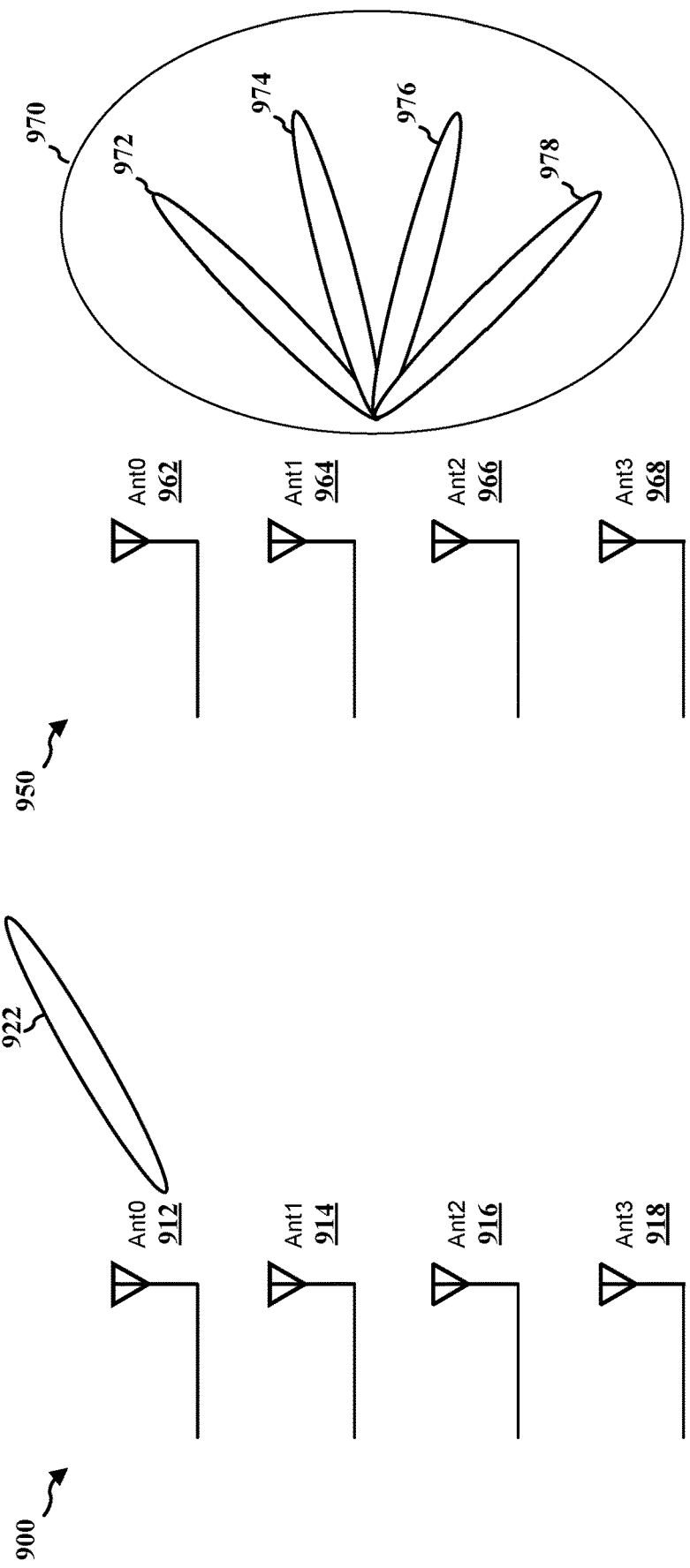
FIGS. 9A and 9B illustrate a plurality of SRS beams and an SRS beam subspace.

FIGS. 9A and 9B illustrate a plurality of SRS beams and an SRS beam subspace 970. In one aspect, FIG. 9A may illustrate an SRS beam transmitted by the plurality of SRS ports 900. Here, the plurality of SRS ports 900 of FIG. 9A may correspond with the plurality of SRS ports 400 of FIG. 4A. The plurality of SRS ports 900 may include a first antenna port 912, a second antenna port 914, a third antenna port 916, and a fourth antenna port 918. The UE may consecutively transmit a first SRS via the first antenna port 912, a second SRS via the second antenna port 914, a third SRS via the third antenna port 916, and a fourth SRS via the fourth antenna port 918. For example, the first SRS may be transmitted via the first antenna port 912 through a first spatial beam 922. The first beam 922 may be associated with a first quasi-co-location (QCL) configuration. The base station may receive the first spatial beam 922 and estimate the first SRS transmitted by the UE. The base station may assume a beam direction based on the first QCL configuration of the first spatial beam 922.

In another aspect, FIG. 9B may illustrate a plurality of SRS beam forming a subspace 970 transmitted by the plurality of SRS ports 950. Here, the plurality of SRS ports 950 of FIG. 9B may correspond with the plurality of SRS ports 500 of FIG. 5A. The plurality of SRS ports 950 may include a first antenna 962 through a first spatial beam 972, a second antenna 964 through a second spatial beam 974, a third antenna 966 through a third spatial beam 976, and a fourth antenna 968 through a fourth spatial beam 978. Since the plurality of spatial beams 972, 974, 976, and 978 may be considered to be quasi-co-located (QCLed) together and the plurality of SRS ports 950 may simultaneously transmit a plurality of SRSs via the time-division multiplexed SRS ports 950, the plurality of spatial beams 972, 974, 976, and 978 may be configured to form or present a QCL Rx beam subspace 970. That is, the base station may configure multiple QCL subspaces for the purpose of beam management instead of indicating UE to assume one specific beam direction. Accordingly, the base station may indicate UE to beam-form with respect to the Rx beam subspace 970, e.g., a hyperplane. The Rx beam subspace 970 may be configured in a manner than the UE may associate the spatial multiplexing of the time-domain multiplexed SRS ports within the subspace 970 in addition to beamforming.

The UE may configure a group of SRS to form the subspace as the QCL Rx beam subspace, and the base station may signal the UE to a specific Rx beam subspace such that it is aligned to the base station's beamforming direction, as well as able to achieve spatial multiplexing gain in the subspace. That is, the base station may transmit, to the UE, a downlink transmission via at least one Tx beam of the base station, where the at least one of the Tx beam may be aligned with the QCL Rx beam subspace, and the UE may receive, from the base station, a downlink transmission via at least one Tx beam of the base station, where the at least one Tx beam of the base station is aligned with the QCL Rx beam subspace.

In one aspect, the SRS may be sounded or transmitted to the base station as the plurality of SRSs simultaneously over a plurality of SRS ports. The SRS may be sounded for at least one of downlink channel state information (DL-CSI) or uplink channel state information (UL-CSI), not for an SRS for antenna switching. In another aspect, the UE may report the UE capability, e.g., the UE capability of spatial TD-OCC SRS sounding with zero guard symbols.

In some aspects, when collide with other UL signals or channel, SRS with the TD-OCC may be given a higher priority. That is, the SRS may be given a higher priority when it collides with other UL signals or channels, and the UE may determine to prioritize the transmission of the SRS over the other UL signals or channels colliding with the SRS with the TD-OCC. The determination may depend on a number of overlapping symbols and which symbol, e.g., the first symbol or the last symbol, different behavior may be specified. In one aspect, if the number of the overlapping symbols are small, the UE may drop one or more ports and configure other ports with less TD-OCC lengths as long as the orthogonality may be preserved. In another aspect, if the overlap happens in the first or the last symbol, the SRS transmission may have better chance of preserving the phase coherency between the phase shifting in the RF plane. However, if the UL signal collides with the SRS in the middle with different power control, SRS may lose the phase coherency for the base station to decode.

In another aspect, the collision of the SRS with other UL transmissions may be handled based on the type or periodicity of the SRS, e.g., aperiodic (AP), semi-persistent (SP), or periodic (P), and the UE may have different behaviors specified for the collision. For example, the AP SRS may have a higher priority than the SP SRS or the P SRS.

FIG. 10 is a call-flow diagram 1000 of a method of wireless communication. The call-flow diagram 1000 may include a UE 1002 and a base station 1004. The UE 1002 may time-division multiplex each of a plurality of SRS ports, and transmit a plurality of SRSs via the plurality of spatially time-division multiplexed SRS ports simultaneously, each of the plurality of SRSs including at least two SRS repetitions. The base station 1004 may receive each of the plurality of SRSs via the plurality of spatially time-division multiplexed SRS ports simultaneously, each the plurality of SRSs including at least two SRS repetitions. The plurality of SRSs may be configured to form or present a QCL Rx beam subspace. The UE 1002 may configure the plurality of SRSs to form the subspace as the QCL Rx beam subspace, and the base station 1004 may signal the UE 1002 to a specific Rx beam subspace such that it is aligned to base station's beamforming direction as well as being able to achieve spatial multiplexing gain in the QCL Rx beam subspace.

At 1006, the UE 1002 may transmit, to the base station 1004, a UE capability for simultaneously transmitting the plurality of SRS s, where the configuration of time-division multiplexing may be based on the UE capability for simultaneously transmitting the plurality of SRSs. The base station 1004 may receive, from the UE 1002, a UE capability for simultaneously transmitting the plurality of SRS s, where the configuration of time-division multiplexing may be based on the UE capability for simultaneously transmitting the plurality of SRSs. In one aspect, the UE capability may also indicate the UE's capability to perform the phase shift between the two SRS symbols, and the base station 1004 may determine values or parameters for the transient period.

At 1008, the base station 1004 may transmit, to the UE 1002, a configuration of time-division multiplexing for the UE 1002 to time-division multiplex each of the plurality of SRS ports. The UE 1002 may receive, from the base station 1004, a configuration of the time-division multiplexing. In one aspect, the configuration may include the values or parameters for the transient period, which may be determined based on the UE capabilities transmitted at 1006. The configuration of the time-division multiplexing is received via at least one of an RRC message, MAC-CE, or DCI.

At 1010, the UE 1002 may spatial time-division multiplex a plurality of SRS ports. Here, each of the plurality of SRS ports being associated with at least one of a set of orthogonal weights, the set of orthogonal weights corresponding to phase shifting. In one aspect, a number of the plurality of SRS ports may be equal to a number of SRS repetitions in each of the plurality of SRSs. In another aspect, the plurality of SRSs may be intra-slot allocated within one slot or inter-slot allocated across consecutive slots. In another aspect, at least a portion of the plurality of SRSs including the at least two SRS repetitions may be allocated within a symbol.

In one aspect, the set of orthogonal weights may include a set of TD-OCCs, and the plurality of SRS ports may be spatially time-division multiplexed using the set of TD-OCCs. In another aspect, the set of orthogonal weights includes orthogonal vectors of a DFT based codebook, and the plurality of SRS ports may be spatially time-division multiplexed using the orthogonal vectors of the DFT based codebook. Here, the at least one processor may be further configured to receive, from the base station, a configuration of the set of TD-OCCs. Here, the configuration of the set of TC-OCC may be included in the configuration of the time-division multiplexing received at 1008. In another aspect, the plurality of SRS ports may be associated with a beam subspace, and transmission of the plurality of SRSs via the plurality of SRS ports may form a QCL Rx beam subspace. Here, 1010 may include 1012.

At 1012, the UE 1002 may configure a transient period between two consecutive symbols of the plurality of time-division multiplexed SRS ports, where the transient period may start from a transient start time and be provided for the phase shifting between the two consecutive symbols. In one aspect, the transient period may be configured symmetrically between the two consecutive symbols. In another aspect, the transient period may be configured with a transient start time that the transient period starts, and the transient start time and the transient period may be based on a capability of the UE 1002. The UE 1002 may configure the transient start time and the transient period based on the values or parameters for the transient period received from the base station 1004 at 1008. The parameters for the transient period may include at least one of the transient period or a start time of the transient period.

In one aspect, at 1014, the UE 1002 may amplify a transmission power of the at least two SRS repetitions from a single Tx chain. At 1015, the UE 1002 may divide the amplified transmission power of the at least two SRS repetitions into the plurality of SRSs transmitted via the plurality of time-division multiplexed SRS ports. That is, the UE 1002 may amplify a transmission power of the at least two SRS repetitions from a single Tx chain, where the at least one SRS with the amplified transmission power is transmitted via the plurality of time-division multiplexed SRS ports. That is, the plurality of SRS ports may include a power amplifier before a splitter. The power amplifier may receive the plurality of SRSs, amplify the received plurality of SRSs, and divide the amplified transmission power of the at least two SRS repetitions into the plurality of SRSs transmitted via the plurality of time-division multiplexed SRS ports.

In another aspect, at 1016, the UE 1002 may divide a transmission power of the at least two SRS repetitions from a single Tx chain into the plurality of SRSs. At 1017, the UE 1002 may amplify a transmission power for all of the plurality of SRSs prior to simultaneously transmitting, to the base station 1004, the plurality of SRSs via the plurality of spatially time-division multiplexed SRS ports. That is, the UE 1002 may divide the transmission power of the at least two SRS repetitions from the single Tx chain, and the UE 1002 may amplify a transmission power for all of the plurality of SRSs, where each of the plurality of SRSs with the amplified transmission power is simultaneously transmitted to the base station 1004. That is, the plurality of SRS ports may include power amplifiers subsequent to the splitter. The power amplifier may receive the plurality of SRSs with the phase shifting in the RF plane, amplify the received plurality of SRSs, and transmit the plurality of SRSs with the amplified power to the corresponding antennas.

At 1018, the UE 1002 may drop at least one or more ports of the plurality of SRS ports based on a location or a number of symbols of the portion of the plurality of SRSs overlapping with the at least one other uplink signal or channel. In some aspects, at least a portion of the plurality of SRSs may overlap with at least one other uplink signal or channel, and the plurality of SRSs may be associated with a higher transmission priority compared to the at least one other uplink signal or channel. When colliding with other UL signals or channels, SRS with the TD-OCC may be determined to have a higher priority. The determination may depend on a number of overlapping symbols and which symbol, e.g., the first symbol or the last symbol, different behavior may be specified. In one aspect, if the number of the overlapping symbols are small, the UE 1002 may drop one or more ports and configure other ports with less TD-OCC lengths as long as the orthogonality may be preserved. In another aspect, if the overlap happens in the first or the last symbol, the UE 1002 may drop at least one or more ports overlapping with the at least one other uplink signal or channel since the SRS transmission may have better chance of preserving the phase coherency between the phase shifting in the RF plane. However, the UE 1002 may not drop the UL signal that collides with the SRS in the middle with different power control because the SRS may lose the phase coherency for the base station 1004 to decode. In another aspect, the collision of the SRS with other UL transmissions may be handled based on the type or periodicity of the SRS, e.g., aperiodic (AP), semi-persistent (SP), or periodic (P), and the UE 1002 may have different behaviors specified for the collision. For example, the AP SRS may have a higher priority than the SP SRS or the P SRS.

At 1020, the UE 1002 may transmit, to the base station 1004, a plurality of SRSs via the plurality of spatially time-division multiplexed SRS ports simultaneously, each of the plurality of SRSs including at least two SRS repetitions. The base station 1004 may receive, from the UE 1002, each of a plurality of SRSs via the plurality of spatially time-division multiplexed SRS ports, the plurality of SRSs including at least two SRS repetitions simultaneously.

At 1022, the base station 1004 may transmit, to the UE 1002, a downlink transmission via at least one Tx beam of the base station 1004, where the at least one of the Tx beam is aligned with the QCL Rx beam subspace. The UE 1002 may receive, from the base station 1004, a downlink transmission via at least one Tx beam of the base station 1004, where the at least one Tx beam of the base station 1004 is aligned with the QCL Rx beam subspace.

Figure 11:
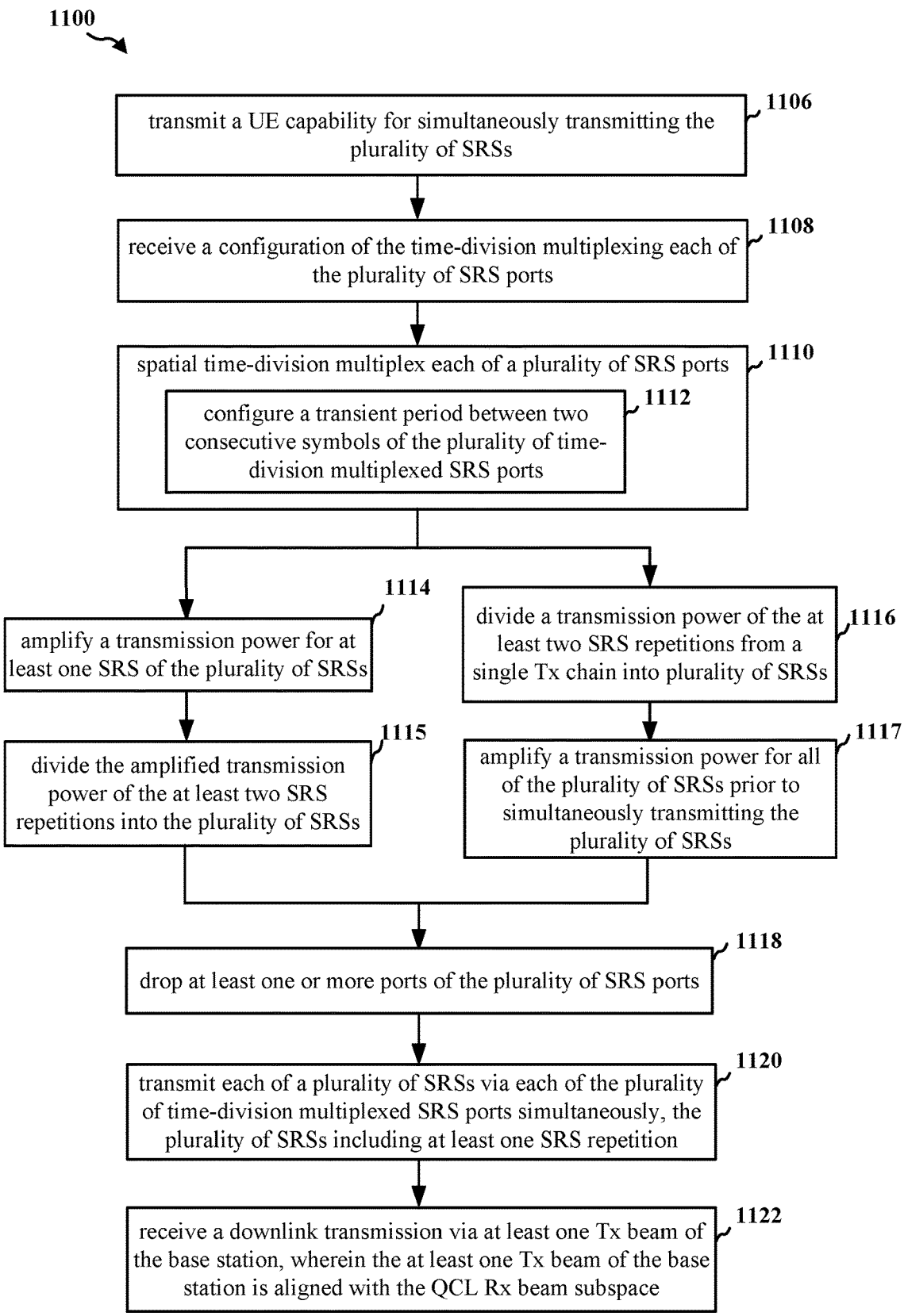
FIG. 11 is a flowchart of a method of wireless communication.

FIG. 11 is a flowchart 1100 of a method of wireless communication. The method may be performed by a UE (e.g., the UE 104/1002; the apparatus 1502). The UE may time-division multiplex each of a plurality of SRS ports, and transmit a plurality of SRSs via the plurality of spatially time-division multiplexed SRS ports simultaneously, each the plurality of SRSs including at least two SRS repetitions. The plurality of SRSs may be configured to form or present a QCL Rx beam subspace. The UE may configure the plurality of SRSs to form the subspace as the QCL Rx beam subspace.

At 1106, the UE may transmit, to the base station, a UE capability for simultaneously transmitting the plurality of SRSs, where the configuration of time-division multiplexing may be based on the UE capability for simultaneously transmitting the plurality of SRSs. In one aspect, the UE capability may also indicate the UE's capability to perform the phase shift between the two SRS symbols, and the base station 1004 may determine values or parameters for the transient period. For example, at 1006, the UE 1002 may transmit, to the base station 1004, a UE capability for simultaneously transmitting the plurality of SRS s, where the configuration of time-division multiplexing may be based on the UE capability for simultaneously transmitting the plurality of SRSs. Furthermore, 1106 may be performed by an SRS ports time-division multiplexing component 1540.

At 1108, the UE may receive, from the base station, a configuration of the time-division multiplexing each of the plurality of SRS ports. In one aspect, the configuration may include the values or parameters for the transient period, which may be determined based on the UE capabilities transmitted at 1106. The configuration of the time-division multiplexing is received via at least one of an RRC message, MAC-CE, or DCI. For example, at 1008, the UE 1002 may receive, from the base station 1004, a configuration of the time-division multiplexing each of the plurality of SRS ports. Furthermore, 1108 may be performed by the SRS ports time-division multiplexing component 1540.

At 1110, the UE may spatial time-division multiplex each of a plurality of SRS ports. Here, each of the plurality of SRS ports being associated with at least one of a set of orthogonal weights, the set of orthogonal weights corresponding to phase shifting. In one aspect, a number of the plurality of SRS ports may be equal to a number of SRS repetitions in each of the plurality of SRSs. In another aspect, the plurality of SRSs may be intra-slot allocated within one slot or inter-slot allocated across consecutive slots. In another aspect, at least a portion of the plurality of SRSs including the at least two SRS repetitions may be allocated within a symbol. In one aspect, the plurality of SRS ports may be spatially time-division multiplexed using a set of TD-OCCs. In another aspect, the set of orthogonal weights may include orthogonal vectors of a DFT based codebook, and the plurality of SRS ports may be spatially time-division multiplexed using the orthogonal vectors of the DFT based codebook. Here, the configuration of the set of TC-OCC may be included in the configuration of the time-division multiplexing received at 1108. In another aspect, the plurality of SRS ports may be associated with a beam subspace, and transmission of the plurality of SRSs via the plurality of SRS ports may form a QCL Rx beam subspace. For example, at 1010, the UE 1002 may time-division multiplex each of a plurality of SRS ports. 1110 may include 1112.

At 1112, the UE may configure a transient period between two consecutive symbols of the plurality of time-division multiplexed SRS ports. Here, the transient period may start from a transient start time and be provided for the phase shifting between the two consecutive symbols. In one aspect, the transient period may be configured symmetrically between the two consecutive symbols. In another aspect, the transient period may be configured with transient start time that the transient period starts, and the transient start time and the transient period may be based on a capability of the UE. The UE may configure the transient period based on the values or parameters for the transient period received from the base station at 1108. The parameters for the transient period may include at least one of the transient period or a start time of the transient period. For example, at 1012, the UE 1002 may configure a transient period between two consecutive symbols of the plurality of time-division multiplexed SRS ports. Furthermore, 1110 and 1112 may be performed by a phase shifting component 1542.

In one aspect, at 1114, the UE may amplify a transmission power of the at least two SRS repetitions from a single Tx chain. At 1115, the UE may divide the amplified transmission power of the at least two SRS repetitions into the plurality of SRSs transmitted via the plurality of time-division multiplexed SRS ports. That is, the UE may amplify a transmission power of the at least two SRS repetitions from a single Tx chain, where the at least one SRS with the amplified transmission power is transmitted via the plurality of time-division multiplexed SRS ports. That is, the plurality of SRS ports may include a power amplifier before a splitter. The power amplifier may receive the plurality of SRSs, amplify the received plurality of SRSs, and divide the amplified transmission power of the at least two SRS repetitions into the plurality of SRSs transmitted via the plurality of time-division multiplexed SRS ports. For example, at 1014, the UE 1002 may amplify a transmission power of the at least two SRS repetitions from a single Tx chain, and at 1015, the UE 1002 may divide the amplified transmission power of the at least two SRS repetitions into the plurality of SRSs. Furthermore, 1114 may be performed by an amplifier component 1542, and 1115 may be performed by a splitter component 1544.

In another aspect, at 1116, the UE may divide a transmission power of the at least two SRS repetitions from a single Tx chain into the plurality of SRSs. At 1117, the UE may amplify a transmission power for all of the plurality of SRSs prior to simultaneously transmitting, to the base station, the plurality of SRSs via the plurality of spatially time-division multiplexed SRS ports. That is, the UE may divide the transmission power of the at least two SRS repetitions from the single Tx chain, and the UE may amplify a transmission power for all of the plurality of SRSs, where each of the plurality of SRSs with the amplified transmission power is simultaneously transmitted to the base station. That is, the plurality of SRS ports may include power amplifiers subsequent to the splitter. The power amplifier may receive the plurality of SRSs with the phase shifting in the RF plane, amplify the received plurality of SRSs, and transmit the plurality of SRSs with the amplified power to the corresponding antennas. For example, at 1016, the UE 1002 may divide a transmission power of the at least two SRS repetitions from a single Tx chain into the plurality of SRSs, and at 1017, the UE 1002 may amplify a transmission power for all of the plurality of SRSs prior to simultaneously transmitting. Furthermore, 1116 may be performed by a splitter component 1544, and 1117 may be performed by an amplifier component 1542.

At 1118, the UE may drop at least one or more ports of the plurality of SRS ports based on a location or a number of symbols of the portion of the plurality of SRSs overlapping with the at least one other uplink signal or channel. In some aspects, at least a portion of the plurality of SRSs may overlap with at least one other uplink signal or channel, and the plurality of SRSs may be associated with a higher transmission priority compared to the at least one other uplink signal or channel. When colliding with other UL signals or channels, SRS with the TD-OCC may be determined to have a higher priority. The determination may depend on a number of overlapping symbols and which symbol, e.g., the first symbol or the last symbol, different behavior may be specified. In one aspect, if the number of the overlapping symbols are small, the UE may drop one or more ports and configure other ports with less TD-OCC lengths as long as the orthogonality may be preserved. In another aspect, if the overlap happens in the first or the last symbol, the UE may drop at least one or more ports overlapping with the at least one other uplink signal or channel since the SRS transmission may have better chance of preserving the phase coherency between the phase shifting in the RF plane. However, the UE may not drop the UL signal that collides with the SRS in the middle with different power control because the SRS may lose the phase coherency for the base station to decode. In another aspect, the collision of the SRS with other UL transmissions may be handled based on the type or periodicity of the SRS, e.g., aperiodic (AP), semi-persistent (SP), or periodic (P), and the UE may have different behaviors specified for the collision. For example, the AP SRS may have a higher priority than the SP SRS or the P SRS. For example, at 1018, the UE 1002 may drop at least one or more ports of the plurality of SRS ports based on a location or a number of symbols of the portion of the plurality of SRSs overlapping with the at least one other uplink signal or channel. Furthermore, 1118 may be performed by the phase shifting SRS ports time-division multiplexing component 1540.

At 1120, the UE may transmit, to the base station, a plurality of SRSs via the plurality of spatially time-division multiplexed SRS ports simultaneously, each of the plurality of SRSs including at least two SRS repetitions. For example, at 1020, the UE 1002 may transmit, to the base station 1004, a plurality of SRSs via the plurality of spatially time-division multiplexed SRS ports simultaneously, each of the plurality of SRSs including at least two SRS repetitions. Furthermore, 1120 may be performed by an SRS transmission component 1546.

At 1122, the UE may receive, from the base station, a downlink transmission via at least one Tx beam of the base station, where the at least one Tx beam of the base station 1004 is aligned with the QCL Rx beam subspace. For example, at 1022, the UE 1002 may receive, from the base station 1004, a downlink transmission via at least one Tx beam of the base station 1004, where the at least one Tx beam of the base station 1004 is aligned with the QCL Rx beam subspace. Furthermore, 1122 may be performed by a DL reception component 1548.

Figure 12:
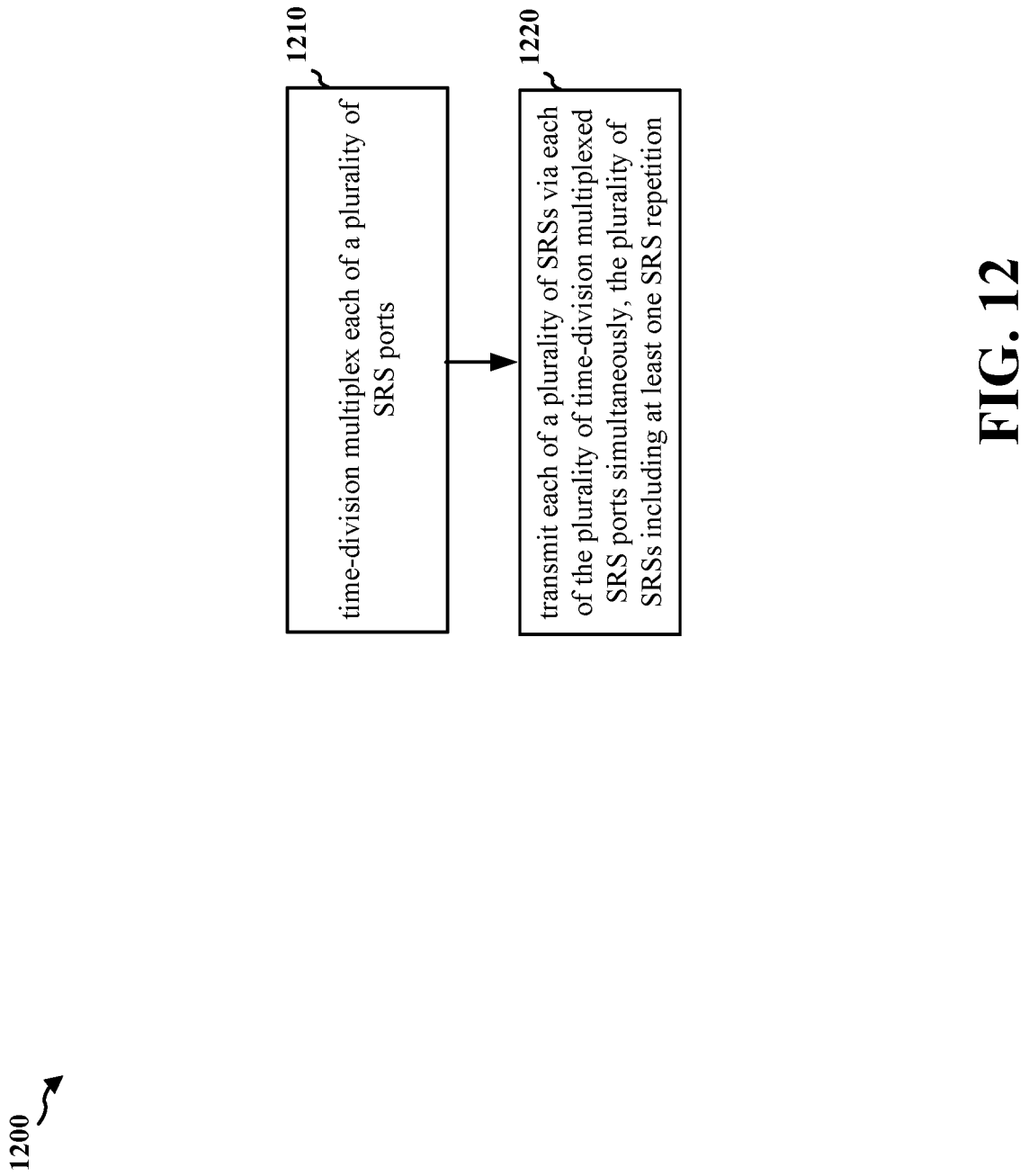
FIG. 12 is a flowchart of a method of wireless communication.

FIG. 12 is a flowchart 1200 of a method of wireless communication. The method may be performed by a UE (e.g., the UE 104/1002; the apparatus 1502). The UE may time-division multiplex each of a plurality of SRS ports, and transmit a plurality of SRSs via the plurality of spatially time-division multiplexed SRS ports simultaneously, the plurality of SRSs including at least two SRS repetitions. The plurality of SRSs may be configured to form or present a QCL Rx beam subspace. The UE may configure the plurality of SRSs to form the subspace as the QCL Rx beam subspace.

At 1210, the UE may spatial time-division multiplex each of a plurality of SRS ports. Here, each of the plurality of SRS ports being associated with at least one of a set of orthogonal weights, the set of orthogonal weights corresponding to phase shifting. In one aspect, a number of the plurality of SRS ports may be equal to a number of SRS repetitions in each of the plurality of SRSs. In another aspect, the plurality of SRSs may be intra-slot allocated within one slot or inter-slot allocated across consecutive slots. In another aspect, at least a portion of the plurality of SRSs including the at least two SRS repetitions may be allocated within a symbol. In one aspect, the plurality of SRS ports may be spatially time-division multiplexed using a set of TD-OCCs. In another aspect, the set of orthogonal weights includes orthogonal vectors of a DFT based codebook, and the plurality of SRS ports may be spatially time-division multiplexed using the orthogonal vectors of a DFT based codebook. Here, the at least one processor may be further configured to receive, from the base station, a configuration of the set of TD-OCCs. Here, the configuration of the set of TC-OCC may be included in the configuration of the time-division multiplexing received. In another aspect, the plurality of SRS ports may be associated with a beam subspace, and transmission of the plurality of SRSs via the plurality of SRS ports may form a QCL Rx beam subspace. For example, at 1010, the UE 1002 may time-division multiplex each of a plurality of SRS ports. Furthermore, 1210 may be performed by the SRS ports time-division multiplexing component 1540.

At 1220, the UE may transmit, to the base station, a plurality of SRSs via the plurality of spatially time-division multiplexed SRS ports simultaneously, each of the plurality of SRSs including at least two SRS repetitions. For example, at 1020, the UE 1002 may transmit, to the base station 1004, a plurality of SRSs via the plurality of spatially time-division multiplexed SRS ports simultaneously, each of the plurality of SRSs including at least two SRS repetitions. Furthermore, 1220 may be performed by an SRS transmission component 1546.

Figure 13:
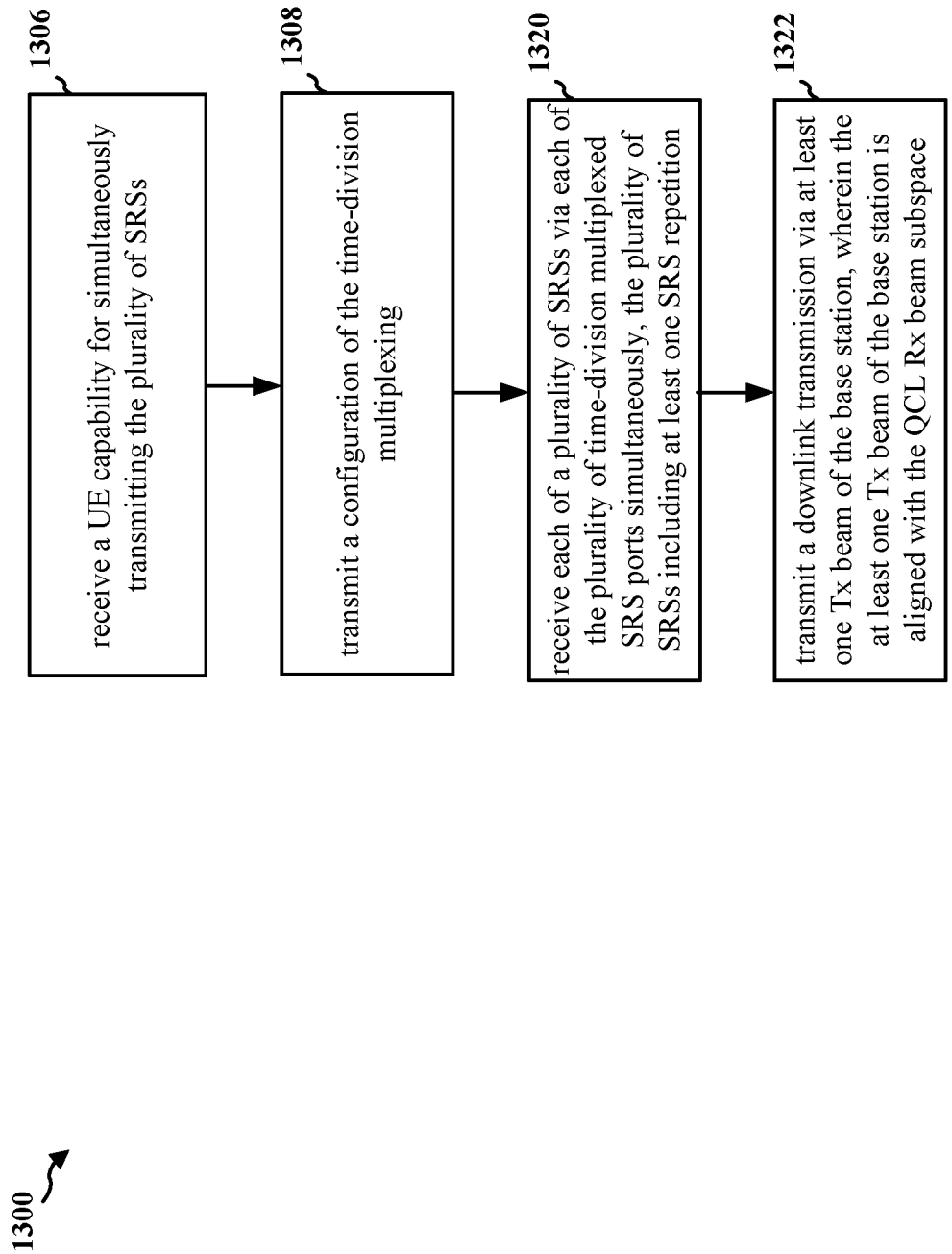
FIG. 13 is a flowchart of a method of wireless communication.

FIG. 13 is a flowchart 1300 of a method of wireless communication. The method may be performed by a base station (e.g., the base station 102/180/1004; the apparatus 1602). The base station may receive each of the plurality of SRSs via the plurality of spatially time-division multiplexed SRS ports simultaneously, the plurality of SRSs including at least two SRS repetitions. The plurality of SRSs may be configured to form or present a QCL Rx beam subspace. The base station may signal the UE to a specific Rx beam subspace such that it is aligned to base station's beamforming direction as well as being able to achieve spatial multiplexing gain in the QCL Rx beam subspace.

At 1306, the base station may receive, from the UE, a UE capability for simultaneously transmitting the plurality of SRS s, where the configuration of time-division multiplexing may be based on the UE capability for simultaneously transmitting the plurality of SRSs. In one aspect, the UE capability may also indicate the UE's capability to perform the phase shift between the two SRS symbols, and the base station may determine values or parameters for the transient period. For example, at 1006, the base station 1004 may receive, from the UE 1002, a UE capability for simultaneously transmitting the plurality of SRS s, where the configuration of time-division multiplexing may be based on the UE capability for simultaneously transmitting the plurality of SRSs. Furthermore, 1306 may be performed by an SRS ports time-division multiplexing component 1640.

At 1308, the base station may transmit, to the UE, a configuration of spatial time-division multiplexing for the UE to spatially time-division multiplex the plurality of SRS ports, each of the plurality of SRS ports being associated with at least one of a set of orthogonal weights, the set of orthogonal weights corresponding to phase shifting. In one aspect, the configuration may include the values or parameters for the transient period, which may be determined based on the UE capabilities received at 1306. The parameters for the transient period may include transient start time and the transient period. In one aspect, the plurality of SRS ports may be spatially time-division multiplexed using a set of TD-OCCs. In another aspect, the set of orthogonal weights may include orthogonal vectors of a DFT based codebook, and the plurality of SRS ports may be spatially time-division multiplexed using the orthogonal vectors of the DFT based codebook. In another aspect, the plurality of SRS ports may be associated with a beam subspace, and transmission of the plurality of SRSs via the plurality of SRS ports may form a QCL Rx beam subspace. The configuration of the time-division multiplexing may be received via at least one of an RRC message, MAC-CE, or DCI. For example, at 1008, the base station 1004 may transmit, to the UE 1002, a configuration of time-division multiplexing for the UE 1002 to time-division multiplex each of the plurality of SRS ports. Furthermore, 1308 may be performed by the SRS ports time-division multiplexing component 1640.

At 1320, the base station may receive, from the UE, a plurality of SRSs via the plurality of spatially time-division multiplexed SRS ports simultaneously, each of the plurality of SRSs including at least two SRS repetitions. In one aspect, a number of the plurality of SRS ports may be equal to a number of SRS repetitions in each of the plurality of SRSs. In another aspect, the plurality of SRSs may be intra-slot allocated within one slot or inter-slot allocated across consecutive slots. In another aspect, at least a portion of the plurality of SRSs including the at least two SRS repetitions may be allocated within a symbol. For example, at 1020, the base station 1004 may receive, from the UE 1002, a plurality of SRSs via the plurality of spatially time-division multiplexed SRS ports, each of the plurality of SRSs including at least two SRS repetitions simultaneously. Furthermore, 1320 may be performed by an SRS reception component 1646.

At 1322, the base station may transmit, to the UE, a downlink transmission via at least one Tx beam of the base station, where the at least one of the Tx beam is aligned with the QCL Rx beam subspace. For example, at 1022, the base station 1004 may transmit, to the UE 1002, a downlink transmission via at least one Tx beam of the base station 1004, where the at least one of the Tx beam is aligned with the QCL Rx beam subspace. Furthermore, 1322 may be performed by a DL transmission component 1648.

Figure 14:
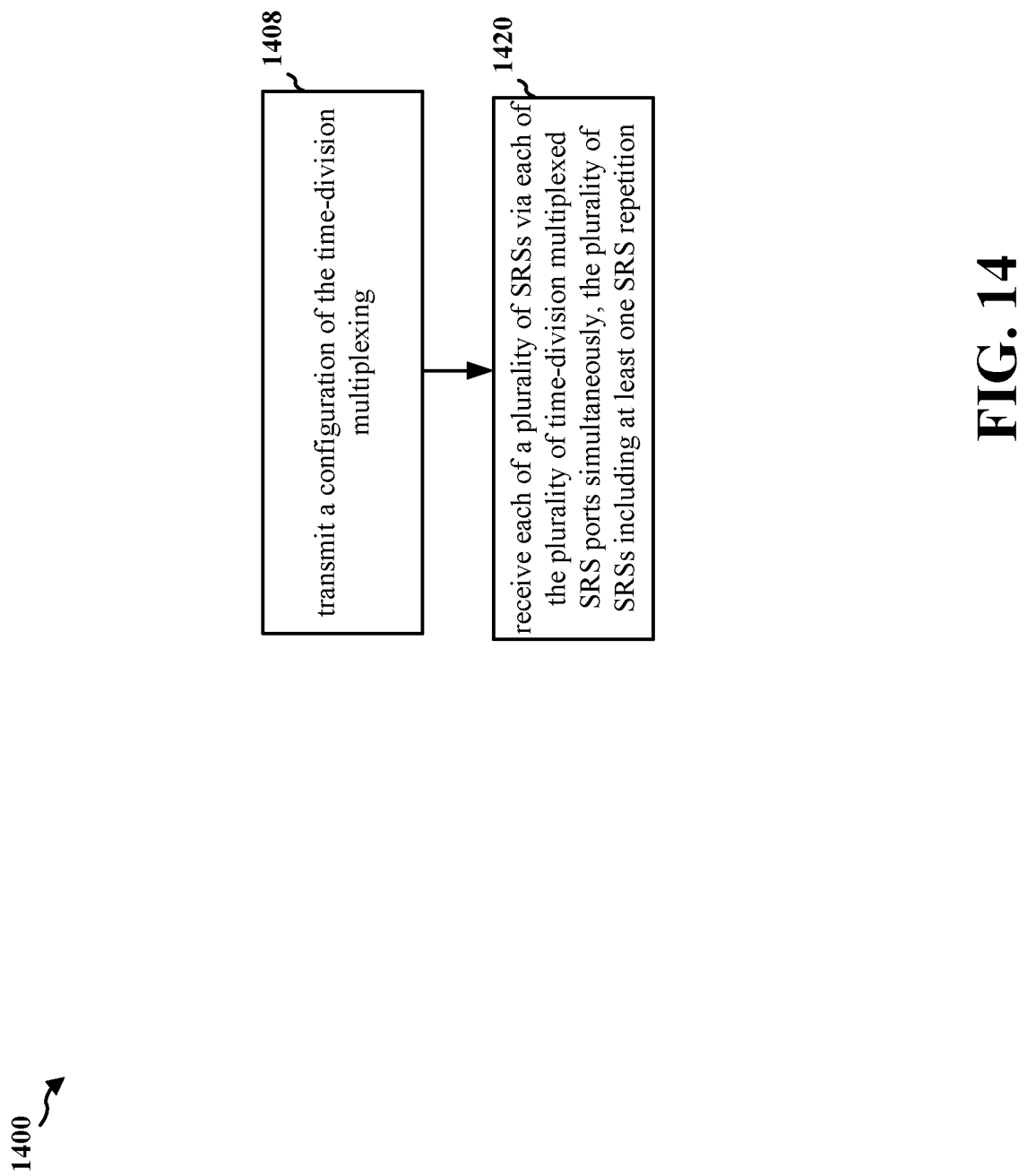
FIG. 14 is a flowchart of a method of wireless communication.

FIG. 14 is a flowchart 1400 of a method of wireless communication. The method may be performed by a base station (e.g., the base station 102/180/1004; the apparatus 1602). The base station may receive each of the plurality of SRSs via the plurality of spatially time-division multiplexed SRS ports simultaneously, the plurality of SRSs including at least two SRS repetitions. The plurality of SRSs may be configured to form or present a QCL Rx beam subspace. The base station may signal the UE to a specific Rx beam subspace such that it is aligned to base station's beamforming direction as well as being able to achieve spatial multiplexing gain in the QCL Rx beam subspace.

At 1408, the base station may transmit, to the UE, a configuration of spatial time-division multiplexing for the UE to spatially time-division multiplex the plurality of SRS ports, each of the plurality of SRS ports being associated with at least one of a set of orthogonal weights, the set of orthogonal weights corresponding to phase shifting. In one aspect, the configuration may include the values or parameters for the transient period, which may be determined based on the UE capabilities received from the UE. The parameters for the transient period may include transient start time and the transient period. In one aspect, the plurality of SRS ports may be spatially time-division multiplexed using a set of TD-OCCs. In another aspect, the set of orthogonal weights may include orthogonal vectors of a DFT based codebook, and the plurality of SRS ports may be spatially time-division multiplexed using the orthogonal vectors of the DFT based codebook. In another aspect, the plurality of SRS ports may be associated with a beam subspace, and transmission of the plurality of SRSs via the plurality of SRS ports may form a QCL Rx beam subspace. The configuration of the time-division multiplexing is received via at least one of an RRC message, MAC-CE, or DCI. For example, at 1008, the base station 1004 may transmit, to the UE 1002, a configuration of time-division multiplexing for the UE 1002 to time-division multiplex each of the plurality of SRS ports. Furthermore, 1408 may be performed by the SRS ports time-division multiplexing component 1640.

At 1420, the base station may receive, from the UE, a plurality of SRSs via the plurality of spatially time-division multiplexed SRS ports simultaneously, each of the plurality of SRSs including at least two SRS repetitions. In one aspect, a number of the plurality of SRS ports may be equal to a number of SRS repetitions in each of the plurality of SRSs. In another aspect, the plurality of SRSs may be intra-slot allocated within one slot or inter-slot allocated across consecutive slots. In another aspect, at least a portion of the plurality of SRSs including the at least two SRS repetitions may be allocated within a symbol. For example, at 1020, the base station 1004 may receive, from the UE 1002, a plurality of SRSs via the plurality of spatially time-division multiplexed SRS ports, each of the plurality of SRSs including at least two SRS repetitions simultaneously. Furthermore, 1420 may be performed by an SRS reception component 1646.

Figure 15:
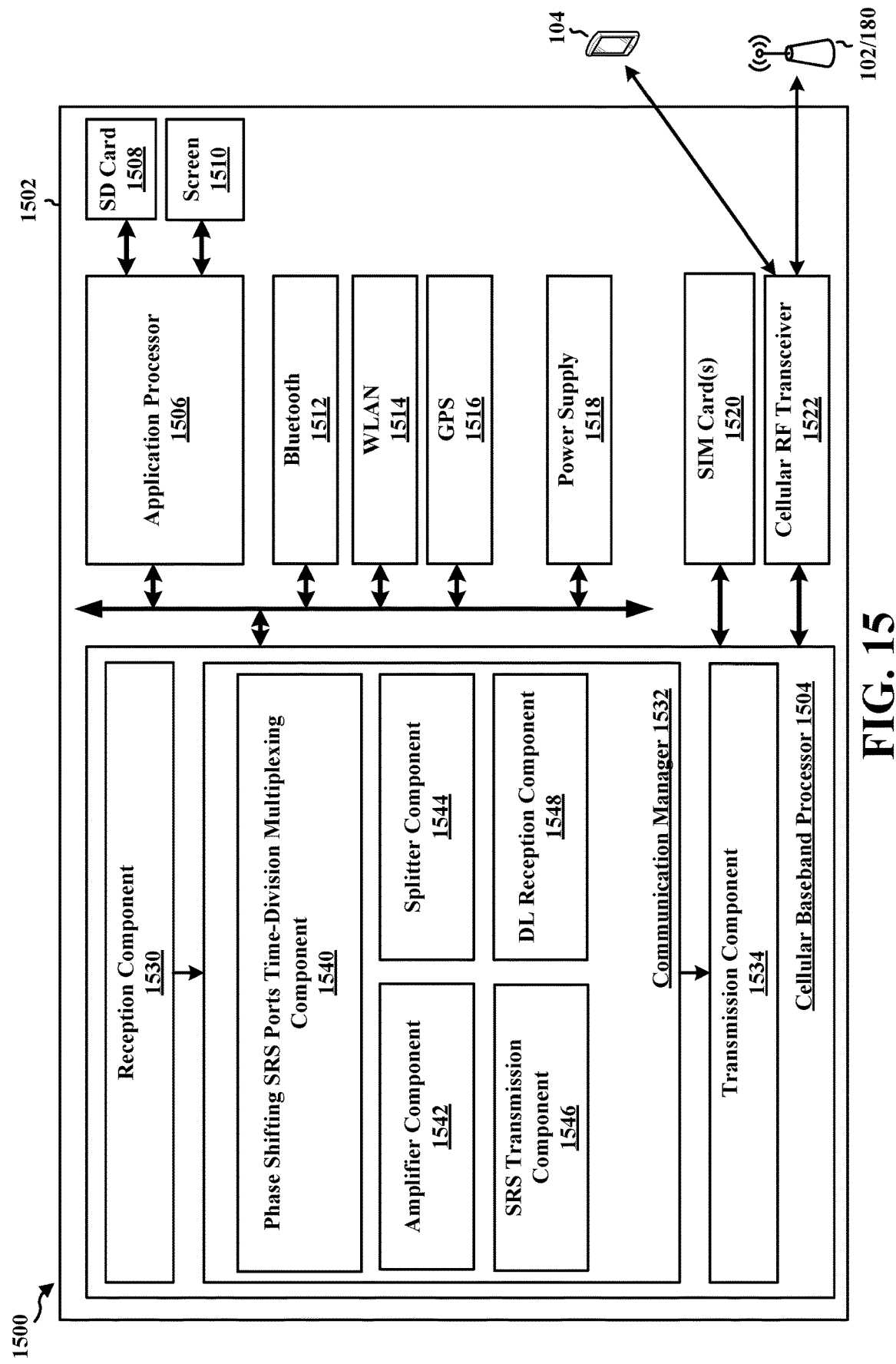
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a phase shifting SRS ports time-division multiplexing component 1540 that is configured to spatial transmit a UE capability for simultaneously transmitting the plurality of SRSs, receive a configuration of the time-division multiplexing each of the plurality of SRS ports, time-division multiplex each of a plurality of SRS ports, configure a transient period between two consecutive symbols of the plurality of time-division multiplexed SRS ports, and drop at least one or more ports of the plurality of SRS ports, e.g., as described in connection with 1106, 1108, 1110, 1112, 1118, and 1210. The communication manager 1532 includes an amplifier component 1542 that is configured to amplify a transmission power of the at least two SRS repetitions from a single Tx chain, and amplify a transmission power for all of the plurality of SRSs prior to simultaneously transmitting the plurality of SRSs, e.g., as described in connection with 1114 and 1117. The communication manager 1532 includes a splitter component 1544 that is configured to divide the amplified transmission power of the at least two SRS repetitions into the plurality of SRSs, and divide a transmission power of the at least two SRS repetitions from a single Tx chain into the plurality of SRSs, e.g., as described in connection with 1115 and 1116. The communication manager 1532 includes an SRS transmission component 1546 that is configured to transmit, to the base station, a plurality of SRSs via the plurality spatially of time-division multiplexed SRS ports simultaneously, e.g., as described in connection with 1120 and 1220. The communication manager 1532 includes a DL reception component 1548 that is configured to receive a downlink transmission via at least one Tx beam of the base station, e.g., as described in connection with 1122.

The apparatus may include additional components that perform each of the blocks of the algorithm in the flowcharts of FIGS. 10, 11, and 12. As such, each block in the flowcharts of FIGS. 10, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for spatial time-division multiplexing a plurality of SRS ports, each of the plurality of SRS ports being associated with at least one of a set of orthogonal weights, the set of orthogonal weights corresponding to phase shifting, and means for transmitting, to a base station, a plurality of SRSs via the plurality of spatially time-division multiplexed SRS ports simultaneously, each of the plurality of SRSs including at least two SRS repetitions. The apparatus 1502 includes means for configuring a transient period between two consecutive symbols of the plurality of time-division multiplexed SRS ports. The apparatus 1502 includes means for amplifying a transmission power of the at least two SRS repetitions from a single Tx chain, and means for dividing the amplified transmission power of the at least two SRS repetitions into the plurality of SRSs transmitted via the plurality of time-division multiplexed SRS ports, or means for dividing a transmission power of the at least two SRS repetitions from a single Tx chain into the plurality of SRSs, and means for amplifying a transmission power for all of the plurality of SRSs prior to simultaneously transmitting, to the base station, the plurality of SRSs via the plurality of spatially time-division multiplexed SRS ports. The apparatus 1502 includes means for transmitting, to the base station, a UE capability for simultaneously transmitting the plurality of SRSs, means for receiving, from the base station, a configuration of the time-division multiplexing each of the plurality of SRS ports, and means for receiving, from the base station, a downlink transmission via at least one Tx beam of the base station, where the at least one Tx beam of the base station is aligned with the QCL Rx beam subspace. The apparatus 1502 includes means for dropping at least one or more ports of the plurality of SRS ports based on a location or a number of symbols of the portion of the plurality of SRSs overlapping with the at least one other uplink signal or channel. The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
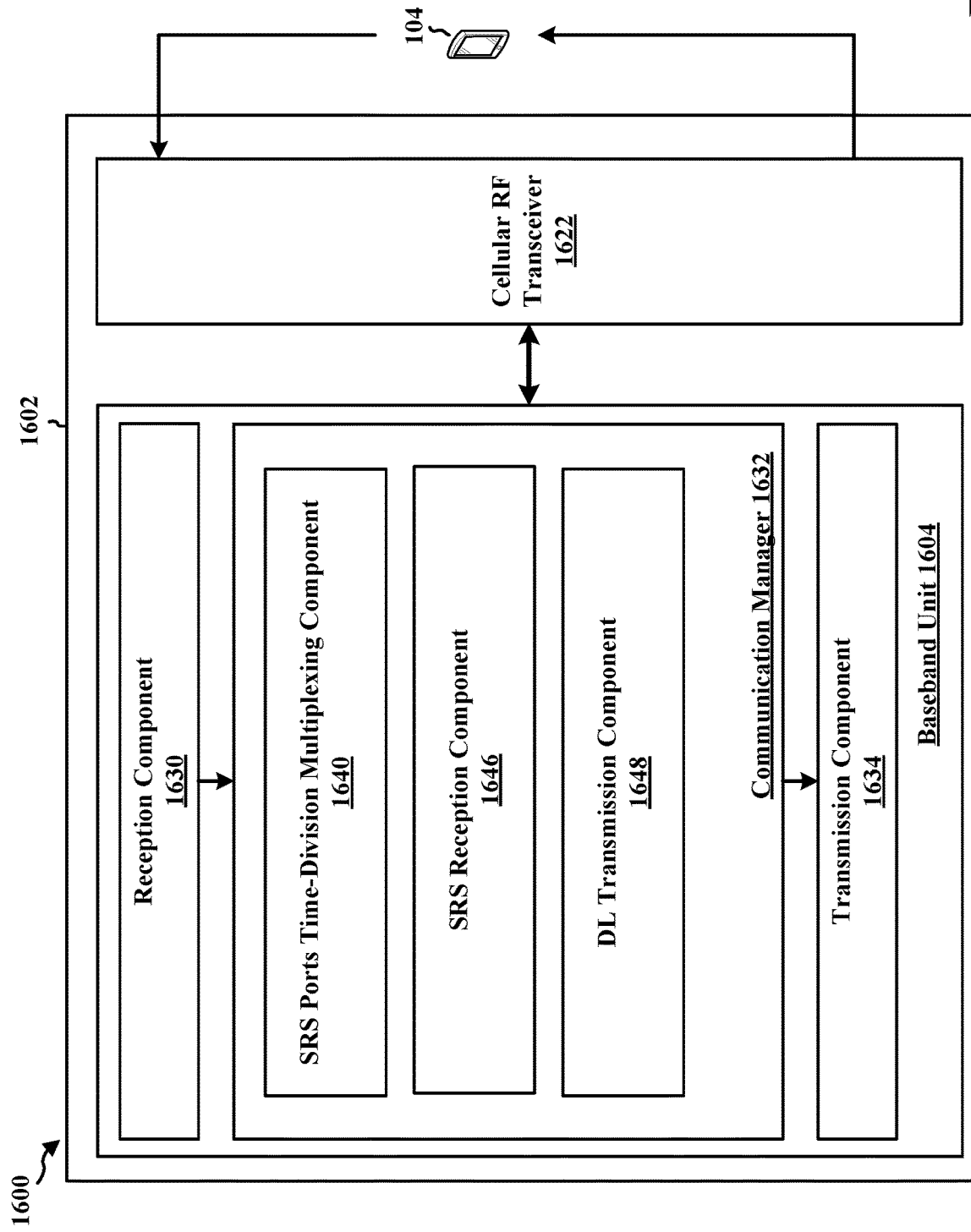
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1502 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes an SRS ports time-division multiplexing component 1640 that is configured to receive a UE capability for simultaneously transmitting the plurality of SRSs, and transmit a configuration of time-division multiplexing for the UE to time-division multiplex each of the plurality of SRS ports, e.g., as described in connection with 1306, 1308, and 1408. The communication manager 1632 includes an SRS reception component 1646 that is configured to receive a plurality of SRSs via the plurality of spatially time-division multiplexed SRS ports, e.g., as described in connection with 1320 and 1420. The communication manager 1632 includes a DL transmission component 1648 that is configured to transmit a downlink transmission via at least one Tx beam of the base station, e.g., as described in connection with 1322.

The apparatus may include additional components that perform each of the blocks of the algorithm in the flowcharts of FIGS. 10, 13, and 14. As such, each block in the flowcharts of FIGS. 10, 13, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for transmitting, to a UE, a configuration of spatial time-division multiplexing for the UE to spatially time-division multiplex a plurality of SRS ports, each of the plurality of SRS ports being associated with at least one of a set of orthogonal weights, the set of orthogonal weights corresponding to phase shifting, and means for receiving, from the UE, a plurality of SRSs via the plurality of spatially time-division multiplexed SRS ports simultaneously, each of the plurality of SRSs including at least two SRS repetitions. The apparatus 1602 includes means for receiving, from the UE, a UE capability for simultaneously transmitting the plurality of SRSs, and means for transmitting, to the UE, a downlink transmission via at least one Tx beam of the base station, where the at least one of the Tx beam is aligned with the QCL Rx beam subspace. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

The UE may spatial time-division multiplex a plurality of SRS ports, each of the plurality of SRS ports being associated with at least one of a set of orthogonal weights, the set of orthogonal weights corresponding to phase shifting, and transmit a plurality of SRSs via the plurality of spatially time-division multiplexed SRS ports simultaneously, the plurality of SRSs including at least two SRS repetitions. The plurality of SRSs may be configured to form or present a QCL Rx beam subspace. The UE may configure the plurality of SRSs to form the subspace as the QCL Rx beam subspace, and the base station may signal the UE to a specific Rx beam subspace such that it is aligned to the base station's beamforming direction, and achieve spatial multiplexing gain in the QCL Rx beam subspace.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to spatial time-division multiplex a plurality of SRS ports, each of the plurality of SRS ports being associated with at least one of a set of orthogonal weights, the set of orthogonal weights corresponding to phase shifting, and transmit, to a base station, a plurality of SRSs via the plurality of spatially time-division multiplexed SRS ports simultaneously, each of the plurality of SRSs including at least two SRS repetitions.

Aspect 2 is the apparatus of aspect 1, further including a transceiver coupled to the at least one processor, where a number of the plurality of SRS ports is equal to a number of SRS repetitions in each of the plurality of SRSs.

Aspect 3 is the apparatus of any of aspects 1 and 2, where the plurality of SRSs is intra-slot allocated within one slot or inter-slot allocated across consecutive slots.

Aspect 4 is the apparatus of any of aspects 1 to 3, where, to spatially time-division multiplex the plurality of SRS ports, the at least one processor is further configured to configure a transient period between two consecutive symbols of the plurality of time-division multiplexed SRS ports, where the transient period starts from a transient start time and is provided for the phase shifting between the two consecutive symbols.

Aspect 5 is the apparatus of aspect 4, where the transient period is configured symmetrically between the two consecutive symbols.

Aspect 6 is the apparatus of any of aspects 4 and 5, where the transient start time and the transient period are based on a capability of the UE.

Aspect 7 is the apparatus of any of aspects 1 to 6, where the at least one processor is further configured to amplify a transmission power of the at least two SRS repetitions from a single Tx chain, and divide the amplified transmission power of the at least two SRS repetitions into the plurality of SRSs transmitted via the plurality of time-division multiplexed SRS ports.

Aspect 8 is the apparatus of any of aspects 1 to 7, where the at least one processor is further configured to divide a transmission power of the at least two SRS repetitions from a single Tx chain into the plurality of SRSs, and amplify a transmission power for all of the plurality of SRSs prior to simultaneously transmitting, to the base station, the plurality of SRSs via the plurality of spatially time-division multiplexed SRS ports.

Aspect 9 is the apparatus of any of aspects 1 to 8, where the set of orthogonal weights includes a set of TD-OCCs.

Aspect 10 is the apparatus of aspect 9, where the at least one processor is further configured to receive, from the base station, a configuration of the set of TD-OCCs.

Aspect 11 is the apparatus of aspect 10, where the configuration of the set of TD-OCCs is received via at least one of an RRC message, a MAC-CE, or DCI.

Aspect 12 is the apparatus of any of aspects 1 to 11, where the at least one processor is further configured to receive, from the base station, a configuration of the time-division multiplexing.

Aspect 13 is the apparatus of aspect 12, where the at least one processor and the memory are further configured to transmit, to the base station, a UE capability for simultaneously transmitting the plurality of SRS s, where the configuration of time-division multiplexing is based on the UE capability for simultaneously transmitting the plurality of SRSs.

Aspect 14 is the apparatus of any of aspects 12 and 13, where the configuration of the time-division multiplexing is received via at least one of a RRC message, MAC-CE, or DCI.

Aspect 15 is the apparatus of any of aspects 1 to 8, where the set of orthogonal weights includes orthogonal vectors of a DFT based codebook.

Aspect 16 is the apparatus of any of aspects 1 to 14, where the plurality of SRS ports is associated with a beam subspace, and transmission of the plurality of SRSs via the plurality of SRS ports forms a QCL Rx beam subspace.

Aspect 17 is the apparatus of aspect 16, where the at least one processor is further configured to: receive, from the base station, a downlink transmission via at least one Tx beam of the base station, where the at least one Tx beam of the base station is aligned with the QCL Rx beam subspace.

Aspect 18 is the apparatus of any of aspects 1 to 17, where at least a portion of the plurality of SRSs including the at least two SRS repetitions is allocated within a symbol.

Aspect 19 is the apparatus of any of aspects 1 to 18, where at least a portion of the plurality of SRSs overlaps with at least one other uplink signal or channel, and the plurality of SRSs are associated with a higher transmission priority compared to the at least one other uplink signal or channel.

Aspect 20 is the apparatus of aspects 19, wherein the at least one processor is further configured to drop at least one or more ports of the plurality of SRS ports based on a location or a number of symbols of the portion of the plurality of SRSs overlapping with the at least one other uplink signal or channel.

Aspect 21 is a method of wireless communication for implementing any of aspects 1 to 20.

Aspect 22 is an apparatus for wireless communication including means for implementing any of aspects 1 to 20.

Aspect 23 is a computer-readable medium storing computer executable code, where the code when executed by a processor causes the processor to implement any of aspects 1 to 20.

Aspect 24 is an apparatus for wireless communication including at least one processor coupled to a memory and configured to, at least in part with the memory, transmit, to a UE, a configuration of spatial time-division multiplexing for the UE to spatially time-division multiplex a plurality of SRS ports, each of the plurality of SRS ports being associated with at least one of a set of orthogonal weights, the set of orthogonal weights corresponding to phase shifting, and receive, from the UE, a plurality of SRSs via the plurality of spatially time-division multiplexed SRS ports simultaneously, each of the plurality of SRSs including at least two SRS repetitions.

Aspect 25 is the apparatus of aspect 24, further including a transceiver coupled to the at least one processor, where a number of the plurality of SRS ports is equal to a number of SRS repetitions in each of the plurality of SRSs.

Aspect 26 is the apparatus of any of aspects 24 and 25, where the plurality of SRSs including the at least two SRS repetitions is intra-slot allocated within one slot or inter-slot allocated across consecutive slots.

Aspect 27 is the apparatus of any of aspects 24 to 26, where a transient period is set between two consecutive symbols of the plurality of time-division multiplexed SRS ports, where the transient period starts from a transient start time and is provided for the phase shifting between the two consecutive symbols.

Aspect 28 is the apparatus of aspect 27, where the transient period is configured symmetrically between the two consecutive symbols.

Aspect 29 is the apparatus of any of aspects 27 and 28, where the transient start time and the transient period is based on a capability of the UE.

Aspect 30 is the apparatus of any of aspects 24 to 29, where the set of orthogonal weights includes a set of TD-OCCs.

Aspect 31 is the apparatus of aspect 30, where a number of TD-OCCs of the set of TD-OCCs is equal to a number of the plurality of SRS ports.

Aspect 32 is the apparatus of any of aspects 24 to 31, where set of orthogonal weights includes orthogonal vectors of a DFT based codebook.

Aspect 33 is the apparatus of any of aspects 24 to 32, where the at least one processor and the memory are further configured to receive, from the UE, a UE capability for simultaneously transmitting the plurality of SRSs, where the configuration of time-division multiplexing is based on the UE capability for simultaneously transmitting the plurality of SRSs.

Aspect 34 is the apparatus of any of aspects 24 to 33, where the configuration of the time-division multiplexing is transmitted via at least one of a RRC message, MAC-CE, or DCI.

Aspect 35 is the apparatus of any of aspects 24 to 34, where the plurality of SRS ports is associated with a beam subspace, and reception of the plurality of SRSs via the plurality of SRS ports forms a QCL Rx beam subspace.

Aspect 36 is the apparatus of any of aspects 24 to 35, where the at least one processor is further configured to transmit, to the UE, a downlink transmission via at least one Tx beam of the base station, where the at least one of the Tx beam is aligned with the QCL Rx beam subspace.

Aspect 37 is the apparatus of any of aspects 24 to 36, where at least a portion of the plurality of SRSs including the at least two SRS repetitions is allocated within a symbol.

Aspect 38 is a method of wireless communication for implementing any of aspects 24 to 37.

Aspect 39 is an apparatus for wireless communication including means for implementing any of aspects 24 to 37.

Aspect 40 is a computer-readable medium storing computer executable code, where the code when executed by a processor causes the processor to implement any of aspects 24 to 37.

What is claimed is:

1. An apparatus for wireless communication at a user equipment (UE), comprising:
   memory; and
   at least one processor coupled to the memory and configured to, at least in part with the memory:
      spatial time-division multiplex a plurality of sounding reference signal (SRS) ports based on a transient period between two consecutive symbols of the plurality of spatially time-division multiplexed SRS ports, each of the plurality of SRS ports being associated with at least one of a set of orthogonal weights, the set of orthogonal weights corresponding to phase shifting, wherein the transient period starts from a transient start time and is provided for the phase shifting between the two consecutive symbols; and
      transmit, to a base station, a plurality of SRSs via the plurality of spatially time-division multiplexed SRS ports simultaneously, each of the plurality of SRSs including at least two SRS repetitions.

2. The apparatus of claim 1, further comprising a transceiver coupled to the at least one processor,
   wherein a number of the plurality of SRS ports is equal to a number of SRS repetitions in each of the plurality of SRSs.

3. The apparatus of claim 1, wherein the plurality of SRSs is intra-slot allocated within one slot or inter-slot allocated across consecutive slots.

4. The apparatus of claim 1, wherein, to spatially time-division multiplex the plurality of SRS ports, the at least one processor is configured to:
   configure the transient period between the two consecutive symbols of the plurality of spatially time-division multiplexed SRS ports.

5. The apparatus of claim 4, wherein to configure the transient period between the two consecutive symbols, the at least one processor is configured to configure the transient period symmetrically between the two consecutive symbols.

6. The apparatus of claim 4, wherein the transient start time and the transient period are based on a capability of the UE.

7. The apparatus of claim 1, wherein the at least one processor is further configured to:
   amplify a transmission power of the at least two SRS repetitions from a single transmit (Tx) chain; and
   divide the amplified transmission power of the at least two SRS repetitions into the plurality of SRSs transmitted via the plurality of spatially time-division multiplexed SRS ports.

8. The apparatus of claim 1, wherein the at least one processor is further configured to:
   divide a transmission power of the at least two SRS repetitions from a single transmit (Tx) chain into the plurality of SRSs; and
   amplify a transmission power for all of the plurality of SRSs prior to simultaneously transmitting, to the base station, the plurality of SRSs via the plurality of spatially time-division multiplexed SRS ports.

9. The apparatus of claim 1, wherein the set of orthogonal weights includes a set of time-domain orthogonal cover codes (TD-OCCs).

10. The apparatus of claim 9, wherein the at least one processor is further configured to receive, from the base station, a configuration of the set of TD-OCCs.

11. The apparatus of claim 10, wherein to receive the configuration of the set of TD-OCCs, the at least one processor is configured to receive the configuration of the set of TD-OCCs via at least one of a radio resource control (RRC) message, a medium access control (MAC) control element (CE) (MAC-CE), or downlink control information (DCI).

12. The apparatus of claim 1, wherein the set of orthogonal weights includes orthogonal vectors of a discrete Fourier transform (DFT) based codebook.

13. The apparatus of claim 1, wherein the at least one processor is further configured to:
   transmit, to the base station, a UE capability for simultaneously transmitting the plurality of SRSs; and
   receive, from the base station, a configuration of the time-division multiplexing each of the plurality of SRS ports,
   wherein the configuration of time-division multiplexing is based on the UE capability for simultaneously transmitting the plurality of SRSs.

14. The apparatus of claim 1, wherein the plurality of SRS ports is associated with a beam subspace, and transmission of the plurality of SRSs via the plurality of SRS ports forms a quasi-co-location (QCL) receive (Rx) beam subspace, and
   wherein the at least one processor is further configured to:
   receive, from the base station, a downlink transmission via at least one transmit (Tx) beam of the base station, wherein the at least one Tx beam of the base station is aligned with the QCL Rx beam subspace.

15. The apparatus of claim 1, wherein at least a portion of the plurality of SRSs including the at least two SRS repetitions is allocated within a symbol.

16. The apparatus of claim 1, wherein at least a portion of the plurality of SRSs overlaps with at least one other uplink signal or channel, and the plurality of SRSs are associated with a higher transmission priority compared to the at least one other uplink signal or channel.

17. The apparatus of claim 16, wherein the at least one processor is further configured to drop at least one or more ports of the plurality of SRS ports based on a location or a number of symbols of the portion of the plurality of SRSs overlapping with the at least one other uplink signal or channel.

18. An apparatus for wireless communication at a base station, comprising:
  memory; and
  at least one processor coupled to the memory and configured to, at least in part with the memory:
    transmit, to a user equipment (UE), a configuration of spatial time-division multiplexing for the UE to spatially time-division multiplex a plurality of sounding reference signal (SRS) ports, each of the plurality of SRS ports being associated with at least one of a set of orthogonal weights, the set of orthogonal weights corresponding to phase shifting, and wherein a transient period is set between two consecutive symbols of the plurality of spatially time-division multiplexed SRS ports, wherein the transient period starts from a transient start time and is provided for the phase shifting between the two consecutive symbols; and
    receive, from the UE, a plurality of SRSs via the plurality of spatially time-division multiplexed SRS ports simultaneously, each of the plurality of SRSs including at least two SRS repetitions.

19. The apparatus of claim 18, further comprising a transceiver coupled to the at least one processor,
  wherein a number of the plurality of SRS ports is equal to a number of SRS repetitions in each of the plurality of SRSs.

20. The apparatus of claim 18, wherein the plurality of SRSs including the at least two SRS repetitions is intra-slot allocated within one slot or inter-slot allocated across consecutive slots.

21. The apparatus of claim 18, wherein the transient period is set between the two consecutive symbols of the plurality of spatially time-division multiplexed SRS ports.

22. The apparatus of claim 21, wherein the transient period is configured symmetrically between the two consecutive symbols.

23. The apparatus of claim 21, wherein the transient start time and the transient period are based on a capability of the UE.

24. The apparatus of claim 18, wherein the set of orthogonal weights includes a set of time-domain orthogonal cover codes (TD-OCCs).

25. The apparatus of claim 18, wherein the set of orthogonal weights includes orthogonal vectors of a discrete Fourier transform (DFT) based codebook.

26. The apparatus of claim 18, wherein the at least one processor is further configured to:
  receive, from the UE, a UE capability for simultaneously transmitting the plurality of SRSs,
  wherein the configuration of time-division multiplexing is based on the UE capability for simultaneously transmitting the plurality of SRSs.

27. The apparatus of claim 18, wherein the plurality of SRS ports is associated with a beam subspace, and reception of the plurality of SRSs via the plurality of SRS ports forms a quasi-co-location (QCL) receive (Rx) beam subspace.

28. The apparatus of claim 27, wherein the at least one processor is further configured to:
  transmit, to the UE, a downlink transmission via at least one transmit (Tx) beam of the base station, wherein the at least one of the Tx beam is aligned with the QCL Rx beam subspace.

29. A method of wireless communication at a user equipment (UE), comprising:
  spatial time-division multiplexing a plurality of sounding reference signal (SRS) ports based on a transient period between two consecutive symbols of the plurality of spatially time-division multiplexed SRS ports, each of the plurality of SRS ports being associated with at least one of a set of orthogonal weights, the set of orthogonal weights corresponding to phase shifting, wherein the transient period starts from a transient start time and is provided for the phase shifting between the two consecutive symbols; and
  transmitting, to a base station, a plurality of SRSs via the plurality of spatially time-division multiplexed SRS ports simultaneously, each of the plurality of SRSs including at least two SRS repetitions.

30. A method of wireless communication at a base station (BS), comprising:
  transmitting, to a user equipment (UE), a configuration of spatial time-division multiplexing for the UE to spatially time-division multiplex a plurality of sounding reference signal (SRS) ports, each of the plurality of SRS ports being associated with at least one of a set of orthogonal weights, the set of orthogonal weights corresponding to phase shifting, and wherein a transient period is set between two consecutive symbols of the plurality of spatially time-division multiplexed SRS ports, wherein the transient period starts from a transient start time and is provided for the phase shifting between the two consecutive symbols; and
  receiving, from the UE, a plurality of SRSs via the plurality of spatially time-division multiplexed SRS ports simultaneously, each of the plurality of SRSs including at least two SRS repetitions.

* * * * *